US008855279B2

(12) United States Patent
Forbes, Jr. et al.

(10) Patent No.: US 8,855,279 B2
(45) Date of Patent: Oct. 7, 2014

(54) APPARATUS AND METHOD FOR CONTROLLING COMMUNICATIONS TO AND FROM UTILITY SERVICE POINTS

(75) Inventors: Joseph W. Forbes, Jr., Wake Forest, NC (US); Joel L. Webb, Oklahoma City, OK (US); John O. F. Long, Raleigh, NC (US)

(73) Assignee: Consert Inc., San Antonio, TX (US)

( * ) Notice: Subject to any disclaimer, the term of this patent is extended or adjusted under 35 U.S.C. 154(b) by 735 days.

(21) Appl. No.: 12/900,884

(22) Filed: Oct. 8, 2010

(65) Prior Publication Data

US 2011/0029655 A1     Feb. 3, 2011

Related U.S. Application Data

(60) Continuation-in-part of application No. 12/715,124, filed on Mar. 1, 2010, now Pat. No. 8,010,812, which is (Continued)

(51) Int. Cl.
| | |
|---|---|
| *H04M 11/00* | (2006.01) |
| *H04M 1/24* | (2006.01) |
| *G06F 1/00* | (2006.01) |
| *G06Q 10/00* | (2012.01) |
| *G06Q 50/06* | (2012.01) |
| *H04B 3/54* | (2006.01) |
| *G01D 4/00* | (2006.01) |

(52) U.S. Cl.
CPC .............. *G06Q 10/00* (2013.01); *Y04S 20/322* (2013.01); *G06Q 50/06* (2013.01); *H04B 2203/5433* (2013.01); *G01D 4/004* (2013.01); *Y02B 90/242* (2013.01); *H04B 3/54* (2013.01)
USPC ................. 379/106.03; 379/1.03; 379/29.01; 713/300

(58) Field of Classification Search
USPC .................................................... 379/106.06
See application file for complete search history.

(56) References Cited

U.S. PATENT DOCUMENTS

| 3,906,242 A | 9/1975 | Stevenson |
| 4,023,043 A | 5/1977 | Stevenson |

(Continued)

FOREIGN PATENT DOCUMENTS

| EP | 1 729 223 A2 | 12/2006 |
| JP | 2000078748 A | 3/2000 |

(Continued)

OTHER PUBLICATIONS

B.J. Kirby, Spinning Reserve from Responsive Loads, Oak Ridge National Laboratory, United States Dept. of Energy, Mar. 2003 (54 pages).

(Continued)

*Primary Examiner* — Joseph T Phan
(74) *Attorney, Agent, or Firm* — Daniel C. Crilly; GrayRobinson, P.A.

(57) ABSTRACT

An apparatus and method control transmission of messages over a fixed bandwidth link from fixed position communication devices to a central controller in a load management system. The messages include information relating to electric power consumption by power consuming devices located at service points that include the communication devices. In one embodiment, the central controller determines an identifier associated with each communication device, a reporting period during which the messages are to be transmitted by the communication devices, and transmission increments within the reporting period. The controller allocates each transmission increment to a respective group of communication devices. The controller then determines a transmission time for a message from a particular communication device based on the identifier for the particular device, a duration of a transmission increment allocated to a group of communication devices that includes the particular device, and a quantity of communication devices in the particular device's group.

6 Claims, 7 Drawing Sheets

Related U.S. Application Data a division of application No. 11/895,909, filed on Aug. 28, 2007, now Pat. No. 7,715,951, application No. 12/900,884, which is a continuation-in-part of application No. 12/715,195, filed on Mar. 1, 2010, now Pat. No. 8,032,233, which is a division of application No. 11/895,909, filed on Aug. 28, 2007, now Pat. No. 7,715,951.

(60) Provisional application No. 61/278,669, filed on Oct. 9, 2009.

(56) References Cited

U.S. PATENT DOCUMENTS

| | | | |
|---|---|---|---|
| 4,077,061 A | 2/1978 | Johnston et al. | |
| 4,589,075 A | 5/1986 | Buennagel | |
| 4,799,059 A | 1/1989 | Grindahl et al. | |
| 4,819,180 A | 4/1989 | Hedman et al. | |
| 4,819,229 A | 4/1989 | Pritty et al. | |
| 5,193,111 A * | 3/1993 | Matty et al. | 379/106.06 |
| 5,237,507 A | 8/1993 | Chasek | |
| 5,361,982 A | 11/1994 | Liebl et al. | |
| 5,388,101 A | 2/1995 | Dinkins | |
| 5,481,546 A | 1/1996 | Dinkins | |
| 5,495,239 A | 2/1996 | Ouellette | |
| 5,502,339 A | 3/1996 | Hartig | |
| 5,544,036 A | 8/1996 | Brown, Jr. et al. | |
| 5,553,094 A | 9/1996 | Johnson et al. | |
| 5,570,002 A | 10/1996 | Castleman | |
| 5,592,491 A | 1/1997 | Dinkins | |
| 5,640,153 A | 6/1997 | Hildebrand et al. | |
| 5,644,173 A | 7/1997 | Elliason et al. | |
| 5,675,503 A | 10/1997 | Moe et al. | |
| 5,682,422 A | 10/1997 | Oliver | |
| 5,696,695 A | 12/1997 | Ehlers et al. | |
| 5,721,936 A | 2/1998 | Kikinis et al. | |
| 5,748,104 A * | 5/1998 | Argyroudis et al. | 340/870.11 |
| 5,892,758 A * | 4/1999 | Argyroudis | 370/335 |
| 5,926,776 A | 7/1999 | Glorioso et al. | |
| 6,014,089 A * | 1/2000 | Tracy et al. | 340/870.02 |
| 6,018,690 A | 1/2000 | Saito et al. | |
| 6,047,274 A | 4/2000 | Johnson et al. | |
| 6,078,785 A * | 6/2000 | Bush | 455/7 |
| 6,102,487 A | 8/2000 | Ovrebo | |
| 6,115,676 A | 9/2000 | Rector et al. | |
| 6,122,603 A | 9/2000 | Budike, Jr. | |
| 6,154,859 A | 11/2000 | Norizuki et al. | |
| 6,178,362 B1 | 1/2001 | Woolard et al. | |
| 6,185,483 B1 | 2/2001 | Drees | |
| 6,216,956 B1 | 4/2001 | Ehlers et al. | |
| 6,233,327 B1 | 5/2001 | Petite | |
| 6,254,009 B1 | 7/2001 | Proffitt et al. | |
| 6,304,552 B1 | 10/2001 | Chapman et al. | |
| 6,374,101 B1 | 4/2002 | Gelbien | |
| 6,437,692 B1 | 8/2002 | Petite et al. | |
| 6,519,509 B1 | 2/2003 | Nierlich et al. | |
| 6,535,797 B1 | 3/2003 | Bowles et al. | |
| 6,577,962 B1 | 6/2003 | Afshari | |
| 6,601,033 B1 | 7/2003 | Sowinski | |
| 6,621,179 B1 | 9/2003 | Howard | |
| 6,622,097 B2 | 9/2003 | Hunter | |
| 6,622,925 B2 | 9/2003 | Carner et al. | |
| 6,628,113 B2 | 9/2003 | Gallavan | |
| 6,633,823 B2 | 10/2003 | Bartone et al. | |
| 6,671,586 B2 | 12/2003 | Davis et al. | |
| 6,681,154 B2 | 1/2004 | Nierlich et al. | |
| 6,687,574 B2 | 2/2004 | Pietrowicz et al. | |
| 6,718,177 B1 * | 4/2004 | Comer et al. | 455/458 |
| 6,732,055 B2 | 5/2004 | Bagepalli et al. | |
| 6,747,571 B2 * | 6/2004 | Fierro et al. | 340/870.02 |
| 6,763,250 B1 | 7/2004 | Forbes, Jr. | |
| 6,778,882 B2 | 8/2004 | Spool et al. | |
| 6,784,807 B2 | 8/2004 | Petite et al. | |
| 6,785,592 B1 | 8/2004 | Smith et al. | |
| 6,832,135 B2 | 12/2004 | Ying | |
| 6,834,811 B1 | 12/2004 | Huberman et al. | |
| 6,836,737 B2 | 12/2004 | Petite et al. | |
| 6,862,498 B2 | 3/2005 | Davis et al. | |
| 6,865,450 B2 | 3/2005 | Masticola et al. | |
| 6,868,293 B1 | 3/2005 | Schurr et al. | |
| 6,879,059 B2 | 4/2005 | Sleva | |
| 6,882,498 B2 | 4/2005 | Kurumatani et al. | |
| 6,891,838 B1 | 5/2005 | Petite et al. | |
| 6,904,336 B2 | 6/2005 | Raines et al. | |
| 6,906,617 B1 | 6/2005 | Van der Meulen | |
| 6,909,942 B2 | 6/2005 | Andarawis et al. | |
| 6,914,533 B2 | 7/2005 | Petite | |
| 6,914,893 B2 | 7/2005 | Petite | |
| 6,934,316 B2 | 8/2005 | Cornwall et al. | |
| 6,961,641 B1 | 11/2005 | Forth et al. | |
| 6,965,302 B2 * | 11/2005 | Mollenkopf et al. | 370/475 |
| 6,965,303 B2 * | 11/2005 | Mollenkopf | 370/485 |
| 6,980,090 B2 * | 12/2005 | Mollenkopf | 375/258 |
| 6,980,091 B2 * | 12/2005 | White et al. | 340/5.53 |
| 6,990,593 B2 | 1/2006 | Nakagawa | |
| 6,998,962 B2 * | 2/2006 | Cope et al. | 370/351 |
| 7,003,640 B2 | 2/2006 | Mayo et al. | |
| 7,019,667 B2 | 3/2006 | Petite et al. | |
| 7,035,719 B2 | 4/2006 | Howard et al. | |
| 7,039,532 B2 | 5/2006 | Hunter | |
| 7,051,332 B2 | 5/2006 | Gatto et al. | |
| 7,053,767 B2 | 5/2006 | Petite et al. | |
| 7,075,414 B2 * | 7/2006 | Giannini et al. | 370/463 |
| 7,079,810 B2 * | 7/2006 | Petite et al. | 455/41.2 |
| 7,088,014 B2 | 8/2006 | Nierlich et al. | |
| 7,089,125 B2 | 8/2006 | Sonderegger | |
| 7,103,511 B2 | 9/2006 | Petite | |
| 7,123,994 B2 | 10/2006 | Weik et al. | |
| 7,130,719 B2 | 10/2006 | Ehlers et al. | |
| 7,133,750 B2 | 11/2006 | Raines et al. | |
| 7,151,943 B2 * | 12/2006 | Comer et al. | 455/458 |
| 7,177,728 B2 | 2/2007 | Gardner | |
| 7,181,320 B2 | 2/2007 | Whiffen et al. | |
| 7,184,861 B2 | 2/2007 | Petite | |
| 7,200,134 B2 | 4/2007 | Proctor, Jr. et al. | |
| 7,206,670 B2 | 4/2007 | Pimputkar et al. | |
| 7,209,804 B2 | 4/2007 | Curt et al. | |
| 7,209,840 B2 | 4/2007 | Petite et al. | |
| 7,231,280 B2 | 6/2007 | Costa | |
| 7,231,281 B2 | 6/2007 | Costa | |
| 7,233,843 B2 | 6/2007 | Budhraja et al. | |
| 7,245,212 B2 * | 7/2007 | Cope et al. | 370/419 |
| 7,250,848 B2 * | 7/2007 | White, II | 340/12.32 |
| 7,263,073 B2 | 8/2007 | Petite et al. | |
| 7,274,975 B2 | 9/2007 | Miller | |
| 7,283,580 B2 * | 10/2007 | Cumeralto et al. | 375/137 |
| 7,289,887 B2 | 10/2007 | Rodgers | |
| 7,295,128 B2 | 11/2007 | Petite | |
| 7,301,440 B2 * | 11/2007 | Mollenkopf | 340/12.32 |
| 7,305,282 B2 | 12/2007 | Chen | |
| 7,313,465 B1 | 12/2007 | O'Donnell | |
| 7,321,316 B2 * | 1/2008 | Hancock et al. | 340/870.02 |
| 7,323,970 B1 * | 1/2008 | Murray et al. | 340/426.12 |
| 7,333,880 B2 | 2/2008 | Brewster et al. | |
| 7,343,341 B2 | 3/2008 | Sandor et al. | |
| 7,345,998 B2 | 3/2008 | Cregg et al. | |
| 7,346,463 B2 | 3/2008 | Petite et al. | |
| 7,366,164 B1 | 4/2008 | Habib et al. | |
| 7,397,907 B2 | 7/2008 | Petite | |
| 7,406,364 B2 | 7/2008 | Andrén et al. | |
| 7,412,304 B2 | 8/2008 | Uenou | |
| 7,424,527 B2 | 9/2008 | Petite | |
| 7,440,871 B2 | 10/2008 | McConnell et al. | |
| 7,451,019 B2 | 11/2008 | Rodgers | |
| 7,468,661 B2 | 12/2008 | Petite et al. | |
| 7,480,501 B2 | 1/2009 | Petite | |
| 7,486,681 B2 | 2/2009 | Weber | |
| 7,528,503 B2 | 5/2009 | Rognli et al. | |
| 7,536,240 B2 | 5/2009 | McIntyre et al. | |
| 7,541,941 B2 | 6/2009 | Bogolea et al. | |
| 7,565,227 B2 | 7/2009 | Richard et al. | |
| 7,639,157 B1 * | 12/2009 | Whitley et al. | 340/870.02 |
| 7,650,425 B2 | 1/2010 | Davis et al. | |

(56) References Cited

U.S. PATENT DOCUMENTS

| | | | |
|---|---|---|---|
| 7,697,492 B2* | 4/2010 | Petite | 370/338 |
| 7,701,325 B2* | 4/2010 | White, II | 340/870.07 |
| 7,711,796 B2 | 5/2010 | Gutt et al. | |
| 7,715,951 B2 | 5/2010 | Forbes, Jr. et al. | |
| 7,738,999 B2 | 6/2010 | Petite | |
| 7,739,378 B2 | 6/2010 | Petite | |
| 7,880,599 B2* | 2/2011 | Murray et al. | 340/441 |
| 7,936,256 B2* | 5/2011 | Murray et al. | 340/426.12 |
| 8,010,812 B2 | 8/2011 | Forbes, Jr. et al. | |
| 8,018,884 B2* | 9/2011 | Lee et al. | 370/311 |
| 8,032,233 B2 | 10/2011 | Forbes, Jr. et al. | |
| 8,131,403 B2 | 3/2012 | Forbes, Jr. et al. | |
| 8,138,934 B2* | 3/2012 | Veillette et al. | 340/635 |
| 8,145,361 B2 | 3/2012 | Forbes, Jr. et al. | |
| 8,203,463 B2* | 6/2012 | Bragg et al. | 340/870.02 |
| 8,253,549 B2* | 8/2012 | Murray et al. | 340/426.1 |
| 8,260,470 B2 | 9/2012 | Forbes, Jr. et al. | |
| 8,307,225 B2 | 11/2012 | Forbes, Jr. et al. | |
| 8,315,717 B2 | 11/2012 | Forbes, Jr. et al. | |
| 8,390,221 B2 | 3/2013 | Jayanth et al. | |
| 8,396,606 B2 | 3/2013 | Forbes, Jr. et al. | |
| 8,527,107 B2* | 9/2013 | Forbes et al. | 700/295 |
| 8,542,685 B2 | 9/2013 | Forbes, Jr. et al. | |
| 2001/0025209 A1 | 9/2001 | Fukui et al. | |
| 2001/0030468 A1 | 10/2001 | Anderson et al. | |
| 2001/0038343 A1 | 11/2001 | Meyer et al. | |
| 2002/0019802 A1 | 2/2002 | Malme et al. | |
| 2002/0035496 A1 | 3/2002 | Fukushima et al. | |
| 2002/0109607 A1 | 8/2002 | Cumeralto et al. | |
| 2002/0138176 A1 | 9/2002 | Davis et al. | |
| 2002/0143693 A1 | 10/2002 | Soestbergen et al. | |
| 2003/0009705 A1 | 1/2003 | Thelander et al. | |
| 2003/0036820 A1 | 2/2003 | Yellepeddy et al. | |
| 2003/0040844 A1 | 2/2003 | Spool et al. | |
| 2003/0063723 A1 | 4/2003 | Booth et al. | |
| 2003/0074304 A1 | 4/2003 | Okada | |
| 2003/0083980 A1 | 5/2003 | Satake | |
| 2003/0144864 A1 | 7/2003 | Mazzarella | |
| 2003/0225483 A1 | 12/2003 | Santinato et al. | |
| 2003/0229572 A1 | 12/2003 | Raines et al. | |
| 2003/0233201 A1 | 12/2003 | Horst et al. | |
| 2004/0006439 A1 | 1/2004 | Hunter | |
| 2004/0088083 A1 | 5/2004 | Davis et al. | |
| 2004/0095237 A1 | 5/2004 | Chen et al. | |
| 2004/0117330 A1 | 6/2004 | Ehlers et al. | |
| 2004/0128266 A1 | 7/2004 | Yellepeddy et al. | |
| 2004/0153170 A1 | 8/2004 | Santacatterina et al. | |
| 2004/0158478 A1 | 8/2004 | Zimmerman | |
| 2004/0162793 A1 | 8/2004 | Scott et al. | |
| 2004/0193329 A1 | 9/2004 | Ransom et al. | |
| 2004/0230533 A1 | 11/2004 | Benco | |
| 2005/0033481 A1 | 2/2005 | Budhraja et al. | |
| 2005/0055432 A1 | 3/2005 | Rodgers | |
| 2005/0065742 A1 | 3/2005 | Rodgers | |
| 2005/0096856 A1 | 5/2005 | Lubkeman et al. | |
| 2005/0096857 A1 | 5/2005 | Hunter | |
| 2005/0116836 A1 | 6/2005 | Perry et al. | |
| 2005/0125243 A1 | 6/2005 | Villalobos | |
| 2005/0138432 A1 | 6/2005 | Ransom et al. | |
| 2005/0192711 A1 | 9/2005 | Raines et al. | |
| 2005/0192713 A1 | 9/2005 | Weik et al. | |
| 2005/0216302 A1 | 9/2005 | Raji et al. | |
| 2005/0216580 A1 | 9/2005 | Raji et al. | |
| 2005/0234600 A1 | 10/2005 | Boucher et al. | |
| 2005/0240314 A1 | 10/2005 | Martinez | |
| 2005/0240315 A1 | 10/2005 | Booth et al. | |
| 2005/0246190 A1 | 11/2005 | Sandor et al. | |
| 2005/0267642 A1 | 12/2005 | Whiffen et al. | |
| 2005/0276222 A1 | 12/2005 | Kumar et al. | |
| 2006/0020544 A1 | 1/2006 | Kaveski | |
| 2006/0022841 A1 | 2/2006 | Hoiness et al. | |
| 2006/0025891 A1 | 2/2006 | Budike, Jr. | |
| 2006/0031934 A1 | 2/2006 | Kriegel | |
| 2006/0064205 A1 | 3/2006 | Ying | |
| 2006/0106635 A1 | 5/2006 | Ulrich et al. | |
| 2006/0142900 A1 | 6/2006 | Rothman et al. | |
| 2006/0142961 A1 | 6/2006 | Johnson et al. | |
| 2006/0161450 A1 | 7/2006 | Carey et al. | |
| 2006/0168191 A1 | 7/2006 | Ives | |
| 2006/0195334 A1 | 8/2006 | Reeb et al. | |
| 2006/0259199 A1 | 11/2006 | Gjerde et al. | |
| 2006/0271244 A1 | 11/2006 | Cumming et al. | |
| 2006/0271314 A1 | 11/2006 | Hayes | |
| 2007/0010914 A1 | 1/2007 | Johnson et al. | |
| 2007/0021874 A1 | 1/2007 | Rognli et al. | |
| 2007/0025249 A1 | 2/2007 | Yeom | |
| 2007/0058453 A1 | 3/2007 | Shaffer et al. | |
| 2007/0058629 A1 | 3/2007 | Luft | |
| 2007/0070895 A1 | 3/2007 | Narvaez | |
| 2007/0085702 A1 | 4/2007 | Walters et al. | |
| 2007/0091900 A1 | 4/2007 | Asthana et al. | |
| 2007/0100503 A1 | 5/2007 | Balan et al. | |
| 2007/0203722 A1 | 8/2007 | Richards et al. | |
| 2007/0204176 A1 | 8/2007 | Shaffer et al. | |
| 2007/0205915 A1 | 9/2007 | Shuey et al. | |
| 2007/0213878 A1 | 9/2007 | Chen | |
| 2007/0255457 A1 | 11/2007 | Whitcomb et al. | |
| 2007/0286210 A1 | 12/2007 | Gutt et al. | |
| 2007/0291644 A1 | 12/2007 | Roberts et al. | |
| 2007/0299562 A1 | 12/2007 | Kates | |
| 2008/0015975 A1 | 1/2008 | Ivchenko et al. | |
| 2008/0015976 A1 | 1/2008 | Sandor et al. | |
| 2008/0091625 A1 | 4/2008 | Kremen | |
| 2008/0130673 A1 | 6/2008 | Cregg et al. | |
| 2008/0147465 A1 | 6/2008 | Raines et al. | |
| 2008/0165714 A1 | 7/2008 | Dettinger et al. | |
| 2008/0172312 A1 | 7/2008 | Synesiou et al. | |
| 2008/0177423 A1 | 7/2008 | Brickfield et al. | |
| 2008/0177678 A1 | 7/2008 | Di Martini et al. | |
| 2008/0183523 A1 | 7/2008 | Dikeman | |
| 2008/0201255 A1 | 8/2008 | Green | |
| 2008/0224892 A1 | 9/2008 | Bogolea et al. | |
| 2008/0228630 A1 | 9/2008 | Gotthelf et al. | |
| 2008/0231114 A1 | 9/2008 | Tolnar et al. | |
| 2008/0238710 A1 | 10/2008 | Tolnar et al. | |
| 2008/0255899 A1 | 10/2008 | McConnell et al. | |
| 2008/0275815 A1 | 11/2008 | Musier et al. | |
| 2008/0281473 A1 | 11/2008 | Pitt | |
| 2009/0018884 A1 | 1/2009 | McConnell et al. | |
| 2009/0043519 A1 | 2/2009 | Bridges et al. | |
| 2009/0043520 A1 | 2/2009 | Pollack et al. | |
| 2009/0055031 A1 | 2/2009 | Slota et al. | |
| 2009/0062970 A1 | 3/2009 | Forbes, Jr. et al. | |
| 2009/0063122 A1 | 3/2009 | Nasle | |
| 2009/0063228 A1 | 3/2009 | Forbes, Jr. | |
| 2009/0088991 A1 | 4/2009 | Brzezowski et al. | |
| 2009/0106571 A1 | 4/2009 | Low et al. | |
| 2009/0112758 A1 | 4/2009 | Herzig | |
| 2009/0135836 A1 | 5/2009 | Veillette | |
| 2009/0157510 A1 | 6/2009 | Pridmore et al. | |
| 2009/0171975 A1 | 7/2009 | McConnell et al. | |
| 2009/0177505 A1 | 7/2009 | Dietrich et al. | |
| 2009/0184689 A1 | 7/2009 | Kressner et al. | |
| 2009/0187499 A1 | 7/2009 | Mulder et al. | |
| 2009/0192894 A1 | 7/2009 | Dikeman | |
| 2009/0210295 A1 | 8/2009 | Edholm et al. | |
| 2009/0228320 A1 | 9/2009 | Lopez et al. | |
| 2009/0228406 A1 | 9/2009 | Lopez et al. | |
| 2009/0240381 A1 | 9/2009 | Lane | |
| 2009/0265568 A1 | 10/2009 | Jackson | |
| 2009/0313033 A1 | 12/2009 | Hafner et al. | |
| 2009/0319091 A1 | 12/2009 | Flohr | |
| 2010/0017045 A1 | 1/2010 | Nesler et al. | |
| 2010/0023376 A1 | 1/2010 | Brown | |
| 2010/0042420 A1 | 2/2010 | Hutchinson | |
| 2010/0063832 A1 | 3/2010 | Brown | |
| 2010/0076825 A1 | 3/2010 | Sato et al. | |
| 2010/0106575 A1 | 4/2010 | Bixby et al. | |
| 2010/0117621 A1 | 5/2010 | Veskovic et al. | |
| 2010/0145534 A1 | 6/2010 | Forbes, Jr. et al. | |
| 2010/0161148 A1 | 6/2010 | Forbes, Jr. et al. | |
| 2010/0179670 A1 | 7/2010 | Forbes, Jr. et al. | |
| 2010/0191862 A1 | 7/2010 | Forbes, Jr. et al. | |
| 2010/0198713 A1 | 8/2010 | Forbes, Jr. et al. | |

(56) References Cited

U.S. PATENT DOCUMENTS

| | | |
|---|---|---|
| 2010/0218010 A1 | 8/2010 | Musti et al. |
| 2010/0222935 A1 | 9/2010 | Forbes, Jr. et al. |
| 2010/0225452 A1 | 9/2010 | Murdoch |
| 2010/0228601 A1 | 9/2010 | Vaswani et al. |
| 2010/0228861 A1 | 9/2010 | Arsovski et al. |
| 2010/0235008 A1 | 9/2010 | Forbes, Jr. et al. |
| 2010/0254290 A1 | 10/2010 | Gong et al. |
| 2011/0022239 A1 | 1/2011 | Forbes, Jr. et al. |
| 2011/0061014 A1 | 3/2011 | Frader-Thompson et al. |
| 2011/0063126 A1 | 3/2011 | Kennedy et al. |
| 2011/0082598 A1 | 4/2011 | Boretto et al. |
| 2011/0115302 A1 | 5/2011 | Slota et al. |
| 2011/0125422 A1 | 5/2011 | Goncalves Jota et al. |
| 2011/0133655 A1 | 6/2011 | Recker et al. |
| 2011/0144819 A1 | 6/2011 | Andrews et al. |
| 2011/0172837 A1 | 7/2011 | Forbes, Jr. |
| 2011/0172841 A1 | 7/2011 | Forbes, Jr. |
| 2011/0196546 A1 | 8/2011 | Muller et al. |
| 2011/0231320 A1 | 9/2011 | Irving |
| 2011/0251730 A1 | 10/2011 | Pitt |
| 2011/0251807 A1 | 10/2011 | Rada et al. |
| 2011/0257809 A1 | 10/2011 | Forbes, Jr. et al. |
| 2011/0258022 A1 | 10/2011 | Forbes, Jr. et al. |
| 2012/0101932 A1 | 4/2012 | Slutsker et al. |
| 2013/0120881 A1 | 5/2013 | Jayanth et al. |
| 2013/0184888 A1 | 7/2013 | Forbes, Jr. et al. |

FOREIGN PATENT DOCUMENTS

| | | | |
|---|---|---|---|
| JP | 2001008380 A | | 1/2001 |
| JP | 2001306839 | | 11/2001 |
| JP | 2002133568 | | 5/2002 |
| JP | 2002133568 A | | 5/2002 |
| JP | 2002176729 A | | 6/2002 |
| JP | 2002281666 A | | 9/2002 |
| JP | 2003067457 A | | 3/2003 |
| JP | 2004248174 A | | 2/2004 |
| JP | 2004112868 A | | 4/2004 |
| JP | 2004180412 A | | 6/2004 |
| JP | 2004301505 A | | 10/2004 |
| JP | 2006060911 A | | 3/2006 |
| JP | 2006277597 A | | 10/2006 |
| JP | 2007132553 A | | 5/2007 |
| JP | 2010081722 A | | 4/2010 |
| JP | 2010119269 A | | 5/2010 |
| JP | 2010183760 A | | 8/2010 |
| KR | 2005001584 A | | 1/2005 |
| KR | 20050045272 A | | 5/2005 |
| KR | 20060036171 A | | 4/2006 |
| KR | 100701298 B1 | | 3/2007 |
| KR | 20070098172 A | | 10/2007 |
| KR | 20080112692 A | | 12/2008 |
| WO | 2005029243 A2 | | 3/2005 |
| WO | 2007136456 A2 | | 11/2007 |
| WO | WO 2008/125696 A2 | | 10/2008 |
| WO | 2009032161 A2 | | 3/2009 |
| WO | 2009032162 A2 | | 3/2009 |
| WO | 2010129059 A1 | | 11/2010 |
| WO | 2010129958 A2 | | 11/2010 |
| WO | 2010132456 A2 | | 11/2010 |
| WO | 2010132469 A2 | | 11/2010 |
| WO | 2010132477 A2 | | 11/2010 |
| WO | 2010134987 A1 | | 11/2010 |
| WO | 2011043818 A2 | | 4/2011 |
| WO | 2011046589 A1 | | 4/2011 |
| WO | 2012106431 A1 | | 8/2012 |
| WO | 2012145102 A2 | | 10/2012 |

OTHER PUBLICATIONS

Eric Hirst and Brendan Kirby, Opportunities for Demand Participation in New England Contingency-Reserve Markets, New England Demand Response Initiative, Feb. 2003 (15 pages).

Pablo A. Ruiz and Peter W. Sauer, Valuation of Reserve Services, IEEE Proceedings of the 41$^{st}$ Hawaii International Conference on System Sciences, 2008 (9 pages).

Eric Hirst and Richard Cowart, Demand Side Resources and Reliability, New England Demand Response Initiative, Mar. 20, 2002 (32 pages).

C.W. Gellings and W.M. Smith, Integrating Demand-Side Management into Utility Planning, Proceedings of the IEEE, vol. 77, Issue: 6, Jun. 1989, pp. 908-918 (Abstract only).

M. Rashidi-Nejad, Y.H. Song, and M.H. Javidi-Dasht-Bayaz, Operating Reserve Provision in Deregulated Power Markets, IEEE Power Engineering Society Winter Meeting, vol. 2, 2002, pp. 1305-1310 (Abstract only).

L.T. Anstine, R.E. Burke, J.E. Casey, R. Holgate, R.S. John, and H.G. Stewart, Application of Probability Methods to the Determination of Spinning Reserve Requirements for the Pennsylvania—New Jersey—Maryland Interconnection; IEEE Transactions on Power Apparatus and Systems, vol. 82, Issue 68, Oct. 1963, pp. 726-735 (Abstract only).

Zhu Jinxiang, G. Jordan, and S. Ihara, The Market for Spinning Reserve and Its Impacts on Energy Prices, IEEE Power Engineering Society Winter Meeting, vol. 2, 2000, pp. 1202-1207 (Abstract Only).

Kathleen Spees and Lester B. Lave, Demand Response and Electricity Market Efficiency, The Electricity Journal, vol. 20, Issue 3, Apr. 2007 (online Mar. 27, 2007), pp. 69-85 (Abstract only).

International Search Report and Written Opinion dated May 31, 2011 issued by the Korean Intellectual Property Office as International Searching Authority in connection with counterpart International Application No. PCT/US2010/002709 (7 pages).

European Patent Office, Extended European Search Report (including Supplementary European Search Report and European Search Opinion) dated Jul. 31, 2013 as issued in connection with counterpart European Patent Application No. 10822357.9 (9 pages).

Australian Patent Office, Patent Examination Report No. 1 dated Jun. 28, 2013 as issued in connection with counterpart Australian Patent Application No. 2010303947 (2 pages).

Korean Intellectual Proptery Office, Notification of Provisional Rejection dated Jul. 30, 2013 as issued in connection with counterpart Korean Patent Application No. 10-2012-7011990 (2 pages).

Japanese Patent Office; Notification of First Office Action dated Jan. 21, 2014, as entered in related Japanese Application No. 2012-260104 (document provides Japanese Patent Office's interpretation of several paragraphs of previously cited JP 2002-133568A) (3 pages).

Korean Intellectual Property Office, Notification of Provisional Rejection dated Jan. 24. 2014, as entered in counterpart Korean Application No. 10-2012-7011990 (3 pages).

* cited by examiner

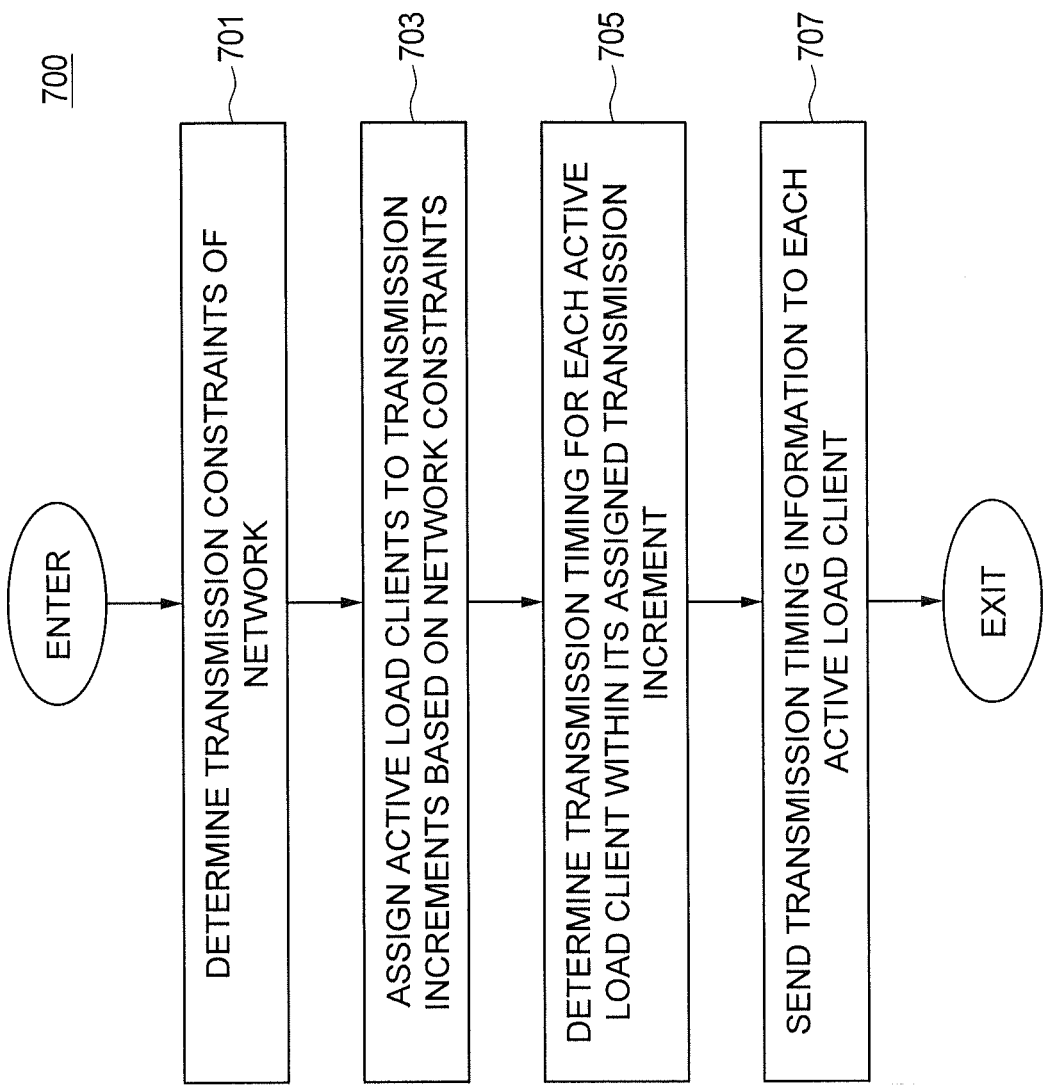

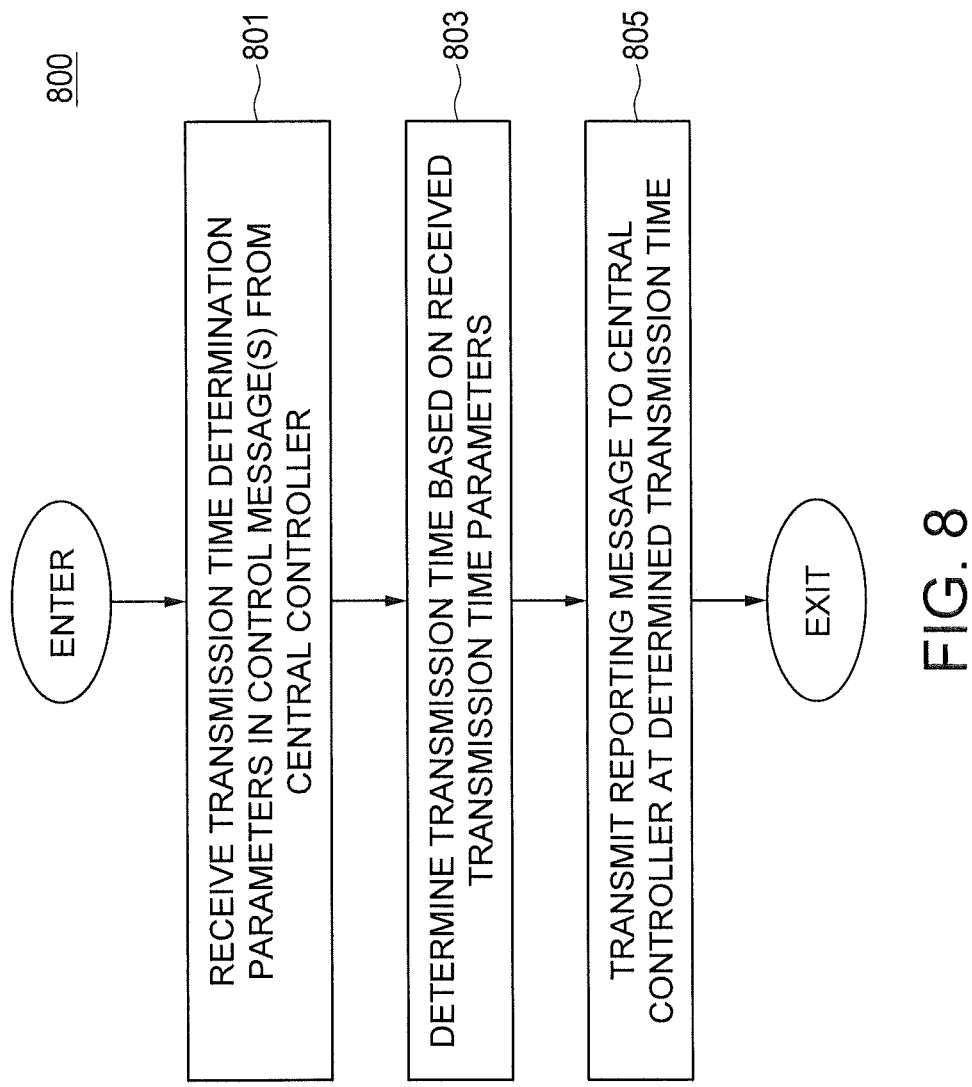

APPARATUS AND METHOD FOR CONTROLLING COMMUNICATIONS TO AND FROM UTILITY SERVICE POINTS

CROSS REFERENCE TO RELATED APPLICATIONS

This application is a continuation-in-part of U.S. application Ser. No. 12/715,124 filed on Mar. 1, 2010, now U.S. Pat. No. 8,010,812 which is a division of U.S. application Ser. No. 11/895,909 filed on Aug. 28, 2007, now U.S. Pat. No. 7,715,951 B2, and is incorporated herein by this reference as if fully set forth herein. This application is also a continuation-in-part of U.S. application Ser. No. 12/715,195 filed on Mar. 1, 2010, now U.S. Pat. No. 8,032,233 which is also a division of U.S. application Ser. No. 11/895,909, filed Aug. 28, 2007 now U.S. Pat. No. 7,715,951 B2, and is incorporated herein by this reference as if fully set forth herein. This application further claims priority under 35 U.S.C. §119(e) upon U.S. Provisional Application Ser. No. 61/278,669 filed on Oct. 9, 2009 solely to the extent of the subject matter disclosed in said provisional application, which application is incorporated herein by this reference as if fully set forth herein. Finally, this application is related to commonly-owned U.S. application Ser. No. 12/001,819 filed on Dec. 13, 2007 and commonly-owned U.S. application Ser. No. 12/896,307 filed on Oct. 1, 2010.

BACKGROUND OF THE INVENTION

1. Field of the Invention

The present invention relates generally to electric power supply and generation systems and, more particularly, to the management and control of communications to and from utility service points.

2. Description of Related Art

The increased awareness of the impact of carbon emissions from the use of fossil-fueled electric generation combined with the increased cost of producing peak power during high load conditions have increased the need for alternative solutions utilizing load control as a mechanism to defer, or in some cases eliminate, the need for deploying additional generation capacity by electric utilities. Existing electric utilities are pressed for methods to reduce, defer, or eliminate the need for construction of fossil-fuel based electricity generation. Today, a patchwork of systems exist to implement demand response load management programs (e.g., typically referred to as "demand side management" or "DSM"), whereby various radio subsystems in various frequency bands utilize "one-way" transmit only methods of communication. Under these programs, radio frequency (RF) controlled relay switches are typically attached to a customer's air conditioner, water heater, or pool pump. A blanket command is sent out to a specific geographic area such that all receiving units within the range of the transmitting station (e.g., typically a paging network) are turned off during peak hours at the election of the power utility. After a period of time when the peak load has passed, a second blanket command is sent to turn on those devices that were previously turned off.

In addition to DSM, some electric utilities utilize telemetering for the express purpose of reporting energy usage. However, no techniques exist for calculating power consumption and/or greenhouse gas emissions (e.g., carbon gas emissions, sulfur dioxide ($SO_2$) gas emissions, and/or nitrogen dioxide ($NO_2$) emissions), and reporting the state of a particular power consuming device or set of power consuming devices operating under the control of a two-way positive control load management policy. In particular, one way wireless communication devices have been utilized in DSM systems to de-activate electrical appliances, such as heating, ventilation, and air-conditioning (HVAC) units, water heaters, pool pumps, and lighting, from an existing electrical supplier or distribution partner's network. These devices have typically been used in combination with wireless paging receivers that receive "on" and "off" commands from a paging transmitter. Additionally, the one-way devices are typically connected to a serving electrical supplier's control center via landline trunks or, in some cases, microwave transmission to the paging transmitter. The customers subscribing to the DSM program receive a discount for allowing the serving electrical supplier (utility) to connect to their electrical appliances and deactivate those appliances temporarily during high energy usage periods.

Power meters and metering technology are important capabilities of the power industry and are used in connection with existing DSM systems. Power meters provide the critical use information necessary for the utility to bill its customers. Conventional power meters use simple technology to detect the amount of electricity used by a customer service point at which the power meter is installed. Thus, the information obtained from a conventional meter is typically the total amount of electricity used by a service point (e.g., residence or business) to date. Meter reading is still typically performed manually on a periodic basis (e.g., monthly), such that a power utility worker physically travels to each assigned meter to read it. The usage or consumption information read from the meter is typically input manually into a handheld data storage device and the data from the storage device is transferred into the utility's billing system. On-site meter reading has a number of disadvantages, including (a) dangers to utility personnel from uncontrolled pets or other animals, (b) physical difficulties gaining access to the meter, (c) weather, and (d) time and cost associated with traveling to a service point, which may be in a remote area.

To overcome many of the problems associated with manual, on-site meter reading, some utilities have begun to use Automatic Meter Reading (AMR) technology that allows utilities to remotely read meters without having to physically view the meter. FIG. 1 illustrates differences between manual meter reading and AMR in an exemplary utility service area. In accordance with AMR technology, advanced meters transmit meter data wirelessly, either automatically or responsive to wireless wake-up polls received from a wireless controller in the general vicinity of the meter. Therefore, advanced meters may be read by workers equipped with wireless data collection devices who simply walk or drive past the service points having advanced meters. When an advanced meter requires a wake-up poll in order to transmit its data, the controller issuing the poll may be included in a wireless data collection device. Because utility personnel do not need to physically view each meter, AMR substantially reduces meter reading time and provides a significant reduction in labor costs, as well as improves the safety of utility personnel. However, because AMR typically requires a utility worker to be in the proximity of each service point in order to read the service point's meter, the labor costs associated with implementing AMR are still substantial.

To overcome the disadvantages of AMR, Advanced Metering or Advanced Metering Infrastructure (AMI) technology was developed. AMI technology allows power utilities to remotely read meters using new communications technology, such as the Internet, power line communications, and wide area wireless technology. AMI technology also allows the use of other remote functionality, such as remote disconnection of power to a service point. The advanced meters used with AMI technology are sometimes referred to as "smart meters."

Thus, AMI provides two-way communication between a utility and the smart meters distributed throughout the utility's service area. Some of the key features of AMI technology include:

Communication "on demand"—Communication between the utility and the smart meter may occur at any time and may be two-way. Communication between the utility and conventional meters typically occurs just once a month and is one-way from the meter to the utility.

Rapid measurement and transmittal of usage data—The amount of power used can be measured much more frequently than the monthly measurement of conventional metering cycles. In addition, these measurements can be transmitted to the utility more frequently.

Information to the utility—Meter data that is sent to the utility may be used to glean additional information about a customer (e.g., power usage patterns), and aggregated data can be used for optimization and planning.

Feedback to the customer—AMI technology enables utilities to provide detailed information about energy usage to their customers, which in turn enables the customers to make intelligent changes to the way they consume electricity.

FIG. 2 illustrates, in block diagram form, how AMI technology works generally for a group of service points 201-205. The utility 207 communicates to smart meters 211-215 at the service points 201-205 using wide area wireless or wired technology. Thus, the utility 207 and all the service points 201-205 in the utility's service area effectively form a wide area network (WAN) 217.

If, in accordance with an AMI protocol, the smart meters 211-215 at all the service points 201-205 are transmitting frequently, there is a risk that all, or at least a substantial number, of the smart meters 211-215 in a utility's service area could transmit at the exact same point in time (i.e., their transmission pulses would be the same) or that such transmissions could overlap and conflict. Depending on the available bandwidth of the WAN's reverse link from the smart meters 211-215 to the utility 207, a substantial number of simultaneous or overlapping transmissions from the smart meters 211-215 can place an inordinate strain on the WAN 217 and cause a data bottleneck, possibly resulting in lost or unacceptably latent (e.g., out-of-date) data. Additionally, depending on the available bandwidth of the WAN's forward link from the utility 207 to the service points 201-205, a transmission bottleneck may also result in the forward direction when the utility 207 attempts to communicate simultaneously or substantially simultaneously with all or substantially all of the smart meters 211-215 in the utility's service area. Such transmission bottlenecks may be exacerbated where the WAN 217 relies upon a public wireless network, such as a cellular network, to implement at least part of the WAN's forward and reverse links, especially after a power outage when the utility 207 and all the smart meters 211-215 attempt to re-synchronize and share current information with one another.

Therefore, a need exists for a system and method for controlling communications between a utility and its service points to reduce the likelihood of data bottlenecks in either the forward or reverse direction.

BRIEF DESCRIPTION OF THE DRAWINGS

FIG. 7 is a logic flow diagram of steps executed by a central controller in an active load management system to control transmissions of messages over a fixed bandwidth communication link, in accordance with one exemplary embodiment of the present invention FIG. 8 is a logic flow diagram of steps executed by an immobile wireless communication device located at a service point in an active load management system to control transmissions of at least one message over a fixed bandwidth communication link, in accordance with another exemplary embodiment of the present invention.

DETAILED DESCRIPTION OF EXEMPLARY EMBODIMENTS

Figure 1:
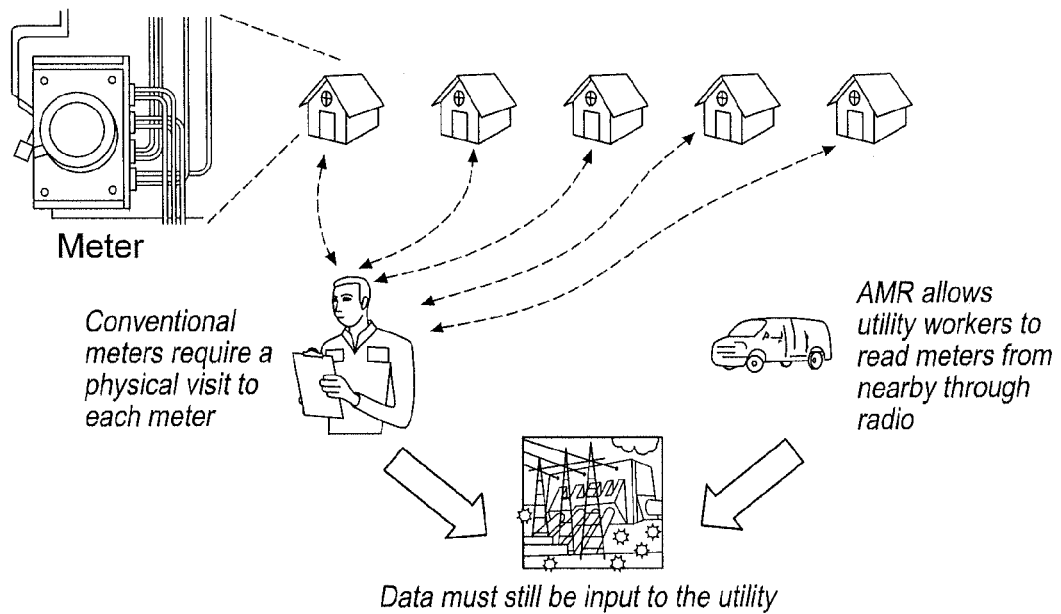
FIG. 1 is a block diagram of an exemplary prior art power distribution system illustrating manual meter reading and meter reading in accordance with Automatic Meter Reading (AMR) technology.
Figure 2:
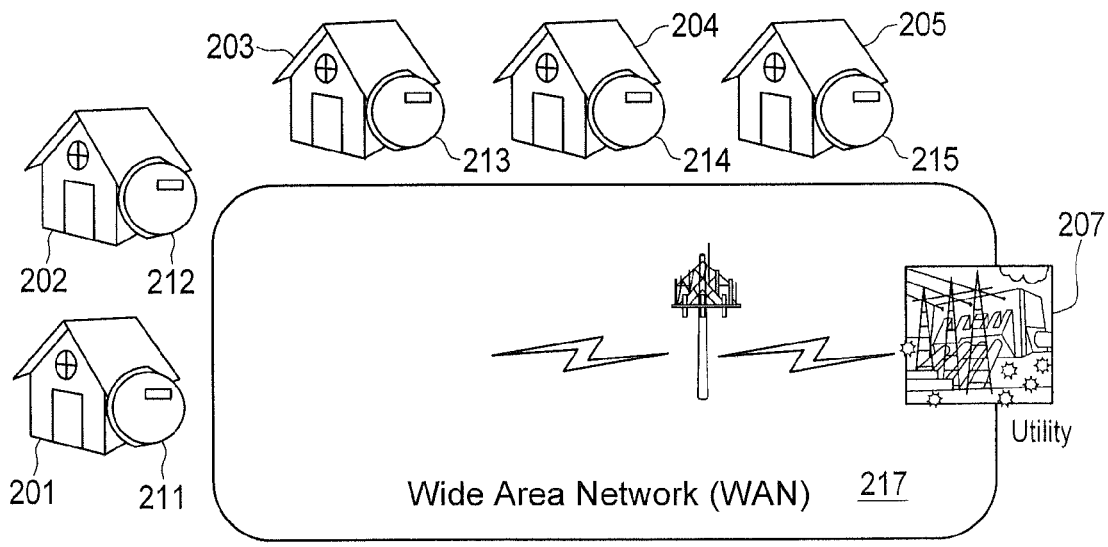
FIG. 2 is a block diagram of an exemplary prior art power distribution system illustrating meter reading in accordance with Advanced Metering Infrastructure (AMI) technology.

Before describing in detail exemplary embodiments that are in accordance with the present invention, it should be observed that the embodiments reside primarily in combinations of apparatus components and processing steps related to controlling transmission of messages over fixed bandwidth communication links between a central controller, such as an active load director, and a plurality of fixed position and immobile communication devices, such as active load client devices, in an active load management system. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms, such as "first" and "second," "top" and "bottom," and the like, may be used solely to distinguish one entity or element from another entity or element without necessarily requiring or implying any physical or logical relationship or order between such entities or elements. The terms "includes," "including," "contains," "containing," "comprises," "comprising," "has," "having," or any other variations thereof are intended to cover a non-exclusive inclusion, such that a process, method, article, apparatus, or anything else that includes, contains, comprises, or has a list of elements does not include only those elements, but may include other elements not expressly listed or inherent to such process, method, article, apparatus, or other thing. The term "plurality of" as used in connection with any object or action means two or more of such object or action. A claim element proceeded by the article "a" or "an" does not, without more constraints, preclude the existence of additional identical elements in the process, method, article, or apparatus that includes the element. The term "ZigBee" refers to any wireless communication protocol adopted by the Institute of Electrical and Electronics Engineers (IEEE) according to standard 802.15.4 or any successor standard(s), and the term "Bluetooth" refers to any short-range wireless communication protocol implementing IEEE standard 802.15.1 or any successor standard(s). Power line communications includes any system communicating data using power lines, including, but not limited to, Broadband over PowerLine (BPL) in its various forms, including through specifications promulgated or being developed by the HOMEPLUG Powerline Alliance and the IEEE. The term "High Speed Packet Data Access (HSPA)" refers to any communication protocol adopted by the International Telecommunication Union (ITU) or another mobile telecommunications standards body referring to the evolution of the Global System for Mobile Communications (GSM) standard beyond its third generation Universal Mobile Telecommunications System (UMTS) protocols. The term "Code Division Multiple Access (CDMA) Evolution Date-Optimized (EVDO) Revision A (CDMA EVDO Rev. A)" refers to the communication protocol adopted by the ITU under standard number TIA-856 Rev. A. The term "Long Term Evolution (LTE)" refers to any communication protocol based on the Third Generation Partnership Project (3GPP) Release 8 (from the ITU) or another mobile telecommunications standards body referring to the evolution of GSM-based networks to voice, video and data standards anticipated to be replacement protocols for HSPA and EVDO. The terms "utility," "electric utility," "power utility," and "electric power utility" refer to any entity that generates and distributes electrical power to its customers, that purchases power from a power-generating entity and distributes the purchased power to its customers, or that supplies electricity created actually or virtually by alternative energy sources, such as solar power, wind power or otherwise, to power generation or distribution entities through the Federal Energy Regulatory Commission (FERC) electrical grid or otherwise. The terms "bandwidth" and "capacity" are used interchangeably herein.

It will be appreciated that embodiments or components of the systems described herein may be comprised of one or more conventional processors and unique stored program instructions that control the one or more processors to implement, in conjunction with certain non-processor circuits, some, most, or all of the functions for managing or controlling transmission of messages over fixed bandwidth communication links in active load management systems as described herein. The non-processor circuits may include, but are not limited to, radio receivers, radio transmitters, antennas, modems, signal drivers, clock circuits, power source circuits, relays, meters, smart breakers, current sensors, and user input devices, just to name a few. As such, these functions may be interpreted as steps of a method to manage or control transmission of messages between devices in an active load management system. Alternatively, some or all of the functions could be implemented by a state machine that has no stored program instructions, or in one or more application specific integrated circuits (ASICs), in which each function or some combinations of functions are implemented as custom logic. Of course, a combination of the foregoing approaches could be used. Thus, methods and means for these functions have been described herein. Further, it is expected that one of ordinary skill in the art, notwithstanding possibly significant effort and many design choices motivated by, for example, available time, current technology, and economic considerations, when guided by the concepts and principles disclosed herein, will be readily capable of generating such software instructions, programs and integrated circuits (ICs), and appropriately arranging and functionally integrating such non-processor circuits, without undue experimentation.

Generally, the present invention encompasses a method and apparatus for controlling transmission of messages over a fixed bandwidth (wired or wireless) communication link to or from a plurality of fixed position (e.g., immobile) communication devices in an active load management system. Messages communicated from the communication devices, which may be active load client devices or smart meters executing software with appropriate reporting functionality, provide information relating at least to electric power consumption by power consuming devices located at service points (e.g., residences or businesses) at which the communication devices are installed or otherwise fixedly positioned. The service points receive electrical power from a utility.

According to one embodiment, a central controller, such as an active load director, operated by the utility or a third party service provider determines an identifier associated with each communication device, a reporting or transmission period during which power reporting messages are to be transmitted by the communication devices, and transmission increments within the reporting period. The controller allocates each transmission increment to a respective group of communication devices and determines a transmission time for at least one power reporting message from a particular communication device based on the identifier for the particular communication device, a duration of a transmission increment allocated to a group of communication devices that includes the particular communication device, and a quantity of communication devices in the particular communication device's group. The controller may then transmit a control message (e.g., transmission time message) containing an indication of the transmission time to the particular communication device over the communication link. By determining transmission times for the communication devices in such a manner, the central controller is able to sufficiently vary or stagger communication device transmissions to reduce the likelihood of lost or undesirably delayed messages due to capacity limitations of the fixed bandwidth communication link.

In an alternative embodiment, the central controller receives a variety of information from a control center of the serving utility and uses such information to determine the transmission times for the communication device. For example, the central controller may receive at least one control message including identifiers associated with the communication devices, a quantity of the communication devices, a quantity of transmission increments within the reporting period, and identifications of transmission increments assigned to groups of communication devices. Based on such information, the central controller may determine the duration of the transmission increment allocated to the group of communication devices that includes a particular communication device based on the quantity of transmission increments within the reporting period and a duration of the reporting period. For example, the duration of the transmission increment may be determined by dividing the duration of the reporting period by the quantity of transmission increments. Additionally, the central controller may determine the quantity of communication devices in a group of communication devices based on the quantity of communication devices and the quantity of transmission increments within the reporting period. For example, for an embodiment in which each group of communication devices includes a substantially equal number of communication devices, the quantity of communication devices per group may be determined by dividing the quantity of communications devices by the quantity of transmission increments per reporting or transmission period. Finally, the transmission time for a particular communication device may be determined by dividing the identifier associated with the communication device (e.g., a sequence number assigned to the communication device, where each communication device is assigned a unique number in a sequence that runs from one through the total number of communications devices in the system) by the quantity of communication devices in the particular communication device's group and multiplying the resulting quotient by the duration or length of the transmission increment assigned to the particular communication device's group. The transmission time in this case would be the time computed relative to the start time of the transmission increment assigned to the particular communication device's group.

In a further embodiment, each communication device may determine its own transmission time for transmitting a reporting message based on information received from a central controller. In such a case, the information received from the central controller may include an identifier associated with the communication device, a quantity of communication devices within the active load management system (e.g., a quantity of communication devices served by the central controller), a quantity of transmission increments within a reporting period during which reporting messages are to be transmitted by the communication devices, and identification of a transmission increment assigned to a group of communication devices containing the communication device. For example, the communication device may determine a quantity of communication devices within a group containing the communication device based on the total quantity of communication devices in the system and the quantity of transmission increments within the reporting period. The communication device may also determine a duration of the transmission increment assigned to the group containing the communication device. The communication device may then determine the transmission time for its reporting message based on the identifier associated with the communication device, the quantity of communication devices within the group containing the communication device, and the duration of the transmission increment assigned to the group containing the communication device. After determining its transmission time, the communication device may transmit at least one reporting message over the communication link at the determined transmission time.

In one embodiment, the communication device may determine the quantity of communication devices within its group of communication devices based on the overall quantity of communication devices and the quantity of transmission increments within the reporting period. For example, for an embodiment in which each group of communication devices includes a substantially equal number of communication devices, the quantity of communication devices per group may be determined by dividing the total quantity of communication devices by the quantity of transmission increments per reporting or transmission period. Additionally, the communication device may determine the duration of the transmission increment assigned to its group of communication devices based on the quantity of transmission increments within the reporting period and a duration of the reporting period. For example, the duration of the transmission increment may be determined by dividing the duration of the reporting period by the quantity of transmission increments. Finally, the communication device may determine its transmission time by dividing the identifier associated with the communication device (e.g., a sequence number assigned to the communication device, where each communication device is assigned a unique number in a sequence that runs from one through the total number of communications devices in the system) by the quantity of communication devices in the communication device's group and multiplying the resulting quotient by the duration or length of the transmission increment assigned to the communication device's group. The transmission time in this case would be the time computed relative to the start time of the transmission increment assigned to the communication device's group.

Figure 3:
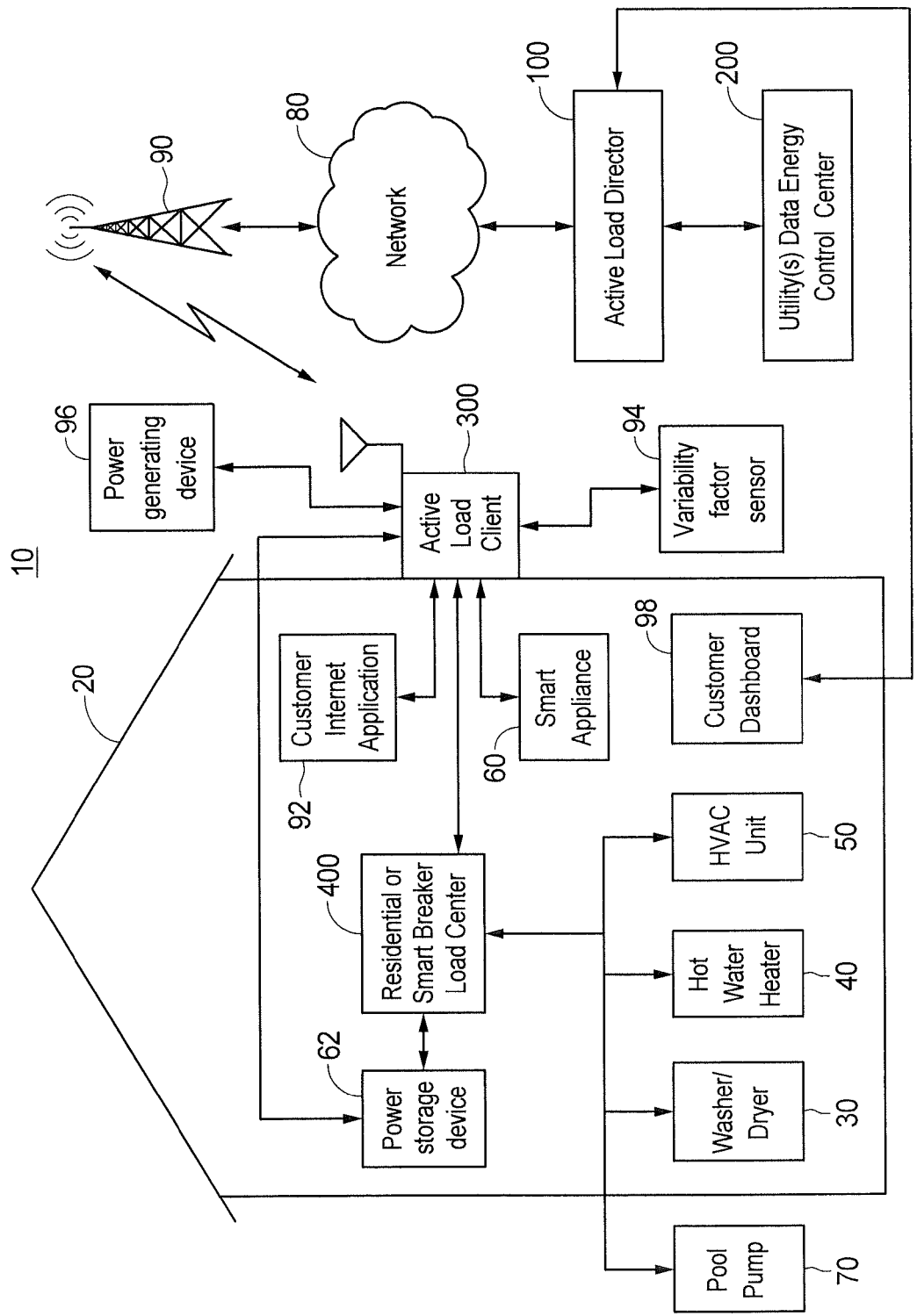
FIG. 3 is a block diagram of an exemplary IP-based, active load management system in accordance with one embodiment of the present invention.

The present invention can be more readily understood with reference to FIGS. 3-8, in which like reference numerals designate like items. FIG. 3 depicts an exemplary IP-based active load management system (ALMS) 10 that may be utilized by an electric utility, which may be a conventional power-generating utility, a serving utility (e.g., an electric cooperative or municipality), or a virtual utility, in accordance with the present invention. The description of the ALMS 10 provided below is limited to specific disclosure relating to embodiments of the present invention. A more general and detailed description of the ALMS 10 is provided in U.S. Pat. No. 7,715,951 B2, which is incorporated herein by this reference as if fully set forth herein. The disclosure of U.S. Pat. No. 7,715,951 provides details with respect to the exemplary operational implementation and execution of control events to interrupt or reduce power to devices located at service points, such as residences and businesses. The use of an ALMS 10 to implement a virtual utility is described in detail in co-pending U.S. application Ser. No. 12/001,819, which was filed on Dec. 13, 2007, was published as U.S. Patent Application Publication No. US 20090063228 A1 on Mar. 5, 2009, and is incorporated herein by this reference as if fully set forth herein.

The exemplary ALMS 10 monitors and manages power distribution via an active load director (ALD) 100 connected between one or more utility control centers (UCCs) 200 (one shown) and one or more active load clients (ALCs) 300 (one shown) installed at one or more service points 20 (one shown). The ALD 100 may communicate with the utility control center 200 and each active load client 300 either directly or through a network 80 using the Internet Protocol (IP) or any other (IP or Ethernet) connection-based protocols. For example, the ALD 100 may communicate using RF systems operating via one or more base stations 90 (one shown) using one or more wireless communication protocols, such as GSM, Enhanced Data GSM Environment (EDGE), ANSI C12.22, HSPA, LTE, Time Division Multiple Access (TDMA), or CDMA data standards, including CDMA 2000, CDMA Revision A, CDMA Revision B, and CDMA EVDO Rev. A. Alternatively, or additionally, the ALD 100 may communicate fully or partially via wired interfaces, such as through the use of digital subscriber line (DSL) technology, cable television IP-based technology, or other related technology. In the exemplary embodiment shown in FIG. 3, the ALD 100 communicates with one or more active load clients 300 using a combination of traditional IP-based communication (e.g., over a trunked line) to a base station 90 and a wireless channel implementing the HSPA or EVDO protocol from the base station 90 to the active load client 300. The distance between the base station 90 and the service point 20 or the active load client 300 is typically referred to as the "last mile" even though the distance may not actually be a mile. The ALD 100 may be implemented in various ways, including, but not limited to, as an individual server, as a blade within a server, in a distributed computing environment, or in other combinations of hardware and software. In the following disclosure, the ALD 100 is described as embodied in an individual server to facilitate an understanding of the present invention.

Each active load client 300 is accessible through a specified address (e.g., IP address) and controls and monitors the state of individual smart breaker modules or intelligent appliances 60 installed at the service point 20 (e.g., in the business or residence 20) with which the active load client 300 is associated (e.g., connected or supporting). Each active load client 300 is associated with a single residential or commercial customer. In one embodiment, the active load client 300 communicates with a residential load center 400 that contains smart breaker modules, which are able to switch from an "ON" (active) state to an "OFF" (inactive) state, and vice versa, responsive to signaling from the active load client 300. Smart breaker modules may include, for example, smart breaker panels manufactured by Schneider Electric SA under the trademark "Square D" or Eaton Corporation under the trademark "Cutler-Hammer" for installation during new construction. For retro-fitting existing buildings, smart breakers having means for individual identification and control may be used. Typically, each smart breaker controls a single appliance (e.g., a washer/dryer 30, a hot water heater 40, an HVAC unit 50, or a pool pump 70). In an alternative embodiment, IP addressable relays or device controllers that operate in a manner similar to a "smart breaker," but would be installed coincident with the load (e.g., power consuming device) under control, would measure the startup power, steady state power, power quality, duty cycle, and/or energy load profile of the individual appliance 60, HVAC unit 40, pool pump 70, hot water heater 40 or any other controllable device as determined by the utility or end customer.

Additionally, the active load client 300 may control individual smart appliances 60 directly (e.g., without communicating with the residential load center 400) via one or more of a variety of known communication protocols (e.g., IP, BPL, Ethernet, Bluetooth, ZigBee, Wi-Fi (IEEE 802.11 protocols), WiMax (IEEE 802.16 protocols), HSPA, EVDO, etc.). Typically, a smart appliance 60 includes a power control module (not shown) having communication abilities. The power control module is installed in-line with the power supply to the appliance, between the actual appliance and the power source (e.g., the power control module is plugged into a power outlet at the home or business and the power cord for the appliance is plugged into the power control module). Thus, when the power control module receives a command to turn off the appliance 60, it disconnects the actual power supplying the appliance 60. Alternatively, a smart appliance 60 may include a power control module integrated directly into the appliance, which may receive commands and control the operation of the appliance 60 directly (e.g., a smart thermostat may perform such functions as raising or lowering the set temperature, switching an HVAC unit on or off, or switching a fan on or off).

The active load client 300 may further be coupled to one or more variability factor sensors 94. Such sensors 94 may be used to monitor a variety of variability factors affecting operation of the devices, such as inside and/or outside temperature, inside and/or outside humidity, time of day, pollen count, amount of rainfall, wind speed, and other factors or parameters.

For a service point 20 associated with a business or industrial setting, the ALMS 10 may be utilized to lower power consumption during times of peak demand by cutting or removing power to switch-based devices (e.g., climate-controlled or environmentally-dependent devices, such as HVAC units) or environmentally-independent devices (such as lights in common areas and/or elevators). Alternatively, the ALMS 10 may be utilized to reduce or increase, as applicable depending upon the set point and/or mode (heating or cooling) of the device, the temperature or other environmental characteristic under the control of environmentally-dependent or climate-controlled devices (such as reducing heating or air conditioning in common areas, reducing furnace temperatures, and/or increasing refrigerator temperatures).

As also shown in FIG. 3, a service point 20 may optionally have one or more on-site power generating devices 96 (one shown), such as solar panels, fuel cells, and/or wind turbines. When included, each power generating device 96 is coupled to the active load client 300. Power supplied by the power generating device 96 may be used in whole or in part by devices at the service point 20 and any extra, unused power may be added to the utility's overall capacity. In accordance with net metering regulations, the utility may provide credit to the service point owner for any energy produced at the service point 20 and supplied to the utility's power grid.

The service point 20 may optionally further include one or more on-site power storage devices 62 (one shown) to store energy supplied by the utility or produced by the power generating device 96. The power storage device 62 may be primarily used for power storage or, more typically, may have another primary purpose, such as power consumption, although storage of power is a secondary purpose. Normally, the power storage device 62 is plugged into the power grid and incrementally stores power which can be used or consumed later. One example of a power storage device 62 is an electric vehicle. When not in use, the power storage device 62 may be plugged into an outlet at the service point 20 to draw and store energy from the utility's grid. The power storage device 62 may then be unplugged later and used for its primary purpose. In the example of an electric vehicle, the power storage device 62 is unplugged to be used for transportation.

Alternatively, the power storage device 62 may, at a later time after being charged, serve as a source of power, akin to a power generating device 96. For example, an electric vehicle may be plugged into a socket at the service point 20 and have some or all of its remaining stored power supplied to the utility's grid when, for example, the vehicle owner is not planning on using the vehicle for awhile. In such a case, the vehicle owner could elect to supply power to the utility grid at high peak load times and receive or consume power from the grid at low peak load times, effectively treating stored power as a commodity.

The service point 20 may further include a web-based user interface (e.g., Internet-accessible web portal) into a web browser interface of the ALD 100. The web-based user interface is referred to herein as a "customer dashboard" 98. When the customer dashboard 98 is accessed by the customer via a computer, smart phone, personal digital assistant, or other comparable device, the customer dashboard 98 may be used by the customer to specify preferences for use by the ALMS 10 to control devices at the customer's service point 20. The customer dashboard 98 effectively provides the customer with access into the ALD 100. The ALD 100 (e.g., through a web browser interface) accepts inputs from the customer dashboard 98 and outputs information to the customer dashboard 98 for display to the customer. The customer dashboard 98 may be accessed from the service point 20 or remotely from any Internet-accessible device, preferably through use of a user name and password for security purposes. Thus, the customer dashboard 98 is preferably a secure, web-based interface used by customers to specify preferences associated with devices controlled by the ALD 100 and located at the customer's service point 20. The customer dashboard 98 may also be used to provide information requested by a customer personal settings application or a customer sign-up application executed by the ALD 100 in connection with controlled devices and/or service point conditions or parameters. Customer preferences may include, for example, control event preferences (e.g., times, durations, etc.), bill management preferences (e.g., goal or target for maximum monthly billing cost), maximum and minimum boundary settings for environmental characteristics or conditions, and various other customer settings.

Figure 4:
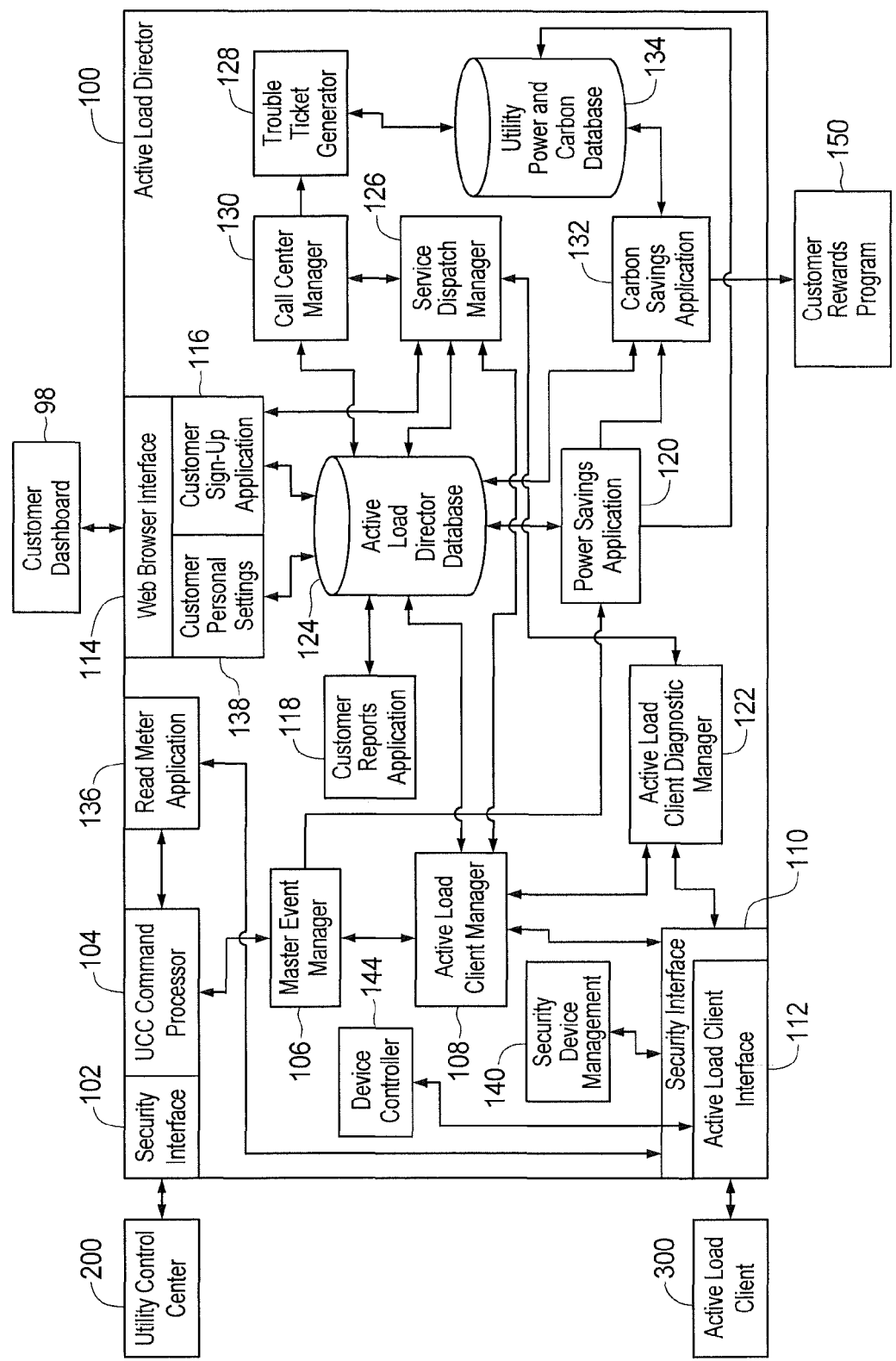
FIG. 4 is a block diagram illustrating an exemplary active load director (ALD) as shown in the active load management system of FIG. 3.

Referring now to FIG. 4, the ALD 100 may serve as the primary interface to customers, as well as to service personnel, and may function as a central controller between the active load clients 300 and the utility. In the exemplary embodiment depicted in FIG. 4, the ALD 100 is implemented as an individual server and includes a utility control center (UCC) security interface 102, a UCC command processor 104, a master event manager 106, an ALC manager 108, an ALC security interface 110, an ALC interface 112, a web browser interface 114, a customer sign-up application 116, customer personal settings 138, a customer reports application 118, a power savings application 120, an ALC diagnostic manager 122, an ALD database 124, a service dispatch manager 126, a trouble ticket generator 128, a call center manager 130, a carbon savings application 132, a utility power and carbon (P&C) database 134, a read meter application 136, a security device manager 140, and a device controller 144. The operational details of several of the elements of the ALD 100 are described below. The operational details of the remaining elements of the ALD 100 may be found in U.S. Pat. No. 7,715,951 and U.S. Patent Application Publication No. US 20090063228 A1, wherein the ALD 100 is also described in the context of an individual server embodiment.

In one embodiment, customers use the customer dashboard 98 to interact with the ALD 100 through the web browser interface 114 and subscribe to some or all of the services offered by the ALMS 10 via a customer sign-up application 116. In accordance with the customer sign-up application 116, the customer enters customer personal settings 138 that contain information relating to the customer and the customer's service point 20 (e.g., residence or business), and specifies the extent of service to which the customer wishes to subscribe. Additional details of the customer sign-up application 116 are discussed below. Customers may also use the customer dashboard 98 to access and modify information pertaining to their existing accounts after they have been established.

The ALD 100 also includes a UCC security interface 102 which provides security and encryption between the ALD 100 and a utility company's control center 200 to ensure that no third party is able to provide unauthorized directions to the ALD 100. A UCC command processor 104 receives and sends messages between the ALD 100 and the utility control center 200. Similarly, an ALC security interface 110 provides security and encryption between the ALD 100 and each active load client 300 in the ALMS 10, ensuring that no third parties can send directions to, or receive information from, the active load client 300. The security techniques employed by the ALC security interface 110 and the UCC security interface 102 may include conventional symmetric key or asymmetric key algorithms, such as Wireless Encryption Protocol (WEP), Wi-Fi Protected Access (WPA and WPA2), Advanced Encryption Standard (AES), Pretty Good Privacy (PGP), or proprietary encryption techniques.

In one embodiment, the commands that can be received by the UCC command processor 104 from the electric utility's control center 200 include a "Cut" command, a "How Much" command, an "End Event" command, and a "Read Meters" command. The "Cut" command instructs the ALD 100 to reduce a specified amount of power for a specified amount of time. The specified amount of power may be an instantaneous amount of power or an average amount of power consumed per unit of time. The "Cut" command may also optionally indicate general geographic areas or specific locations for power load reduction. The "How Much" command requests information for the amount of power (e.g., in megawatts) that can be reduced by the requesting utility control center 200. The "End Event" command stops the present ALD transaction or load control event. The "Read Meters" command instructs the ALD 100 to read the meters for all customers serviced by the requesting utility.

The UCC command processor 104 may send a response to a "How Much" command or an "Event Ended" status confirmation to a utility control center 200. A response to a "How Much" command returns an amount of power that can be cut. An "Event Ended" acknowledgement message confirms that the present ALD transaction or load control event has ended.

In an alternative embodiment, the UCC command processor 104 may receive one or more update or other messages from the utility control center 200, which contain transmission time determination parameters. The transmission time determination parameters may be used by the ALC manager 108 or equivalent device or software to determine transmission times for the active load clients 300. Such parameters may include identifiers for the active load client devices 300, a quantity of the active load client devices 300, a quantity of transmission increments within a transmission period, and identifications of transmission increments assigned to groups of active load client devices 300. The determination of transmission times based on such parameters is described in detail below.

The master event manager 106 maintains the overall status of the power load activities controlled by the ALMS 10. In one embodiment, the master event manager 106 maintains a separate state for each utility that is controlled (when multiple utilities are controlled) and tracks the current power usage within each utility. The master event manager 106 also tracks the management condition of each utility (e.g., whether or not each utility is currently being managed). The master event manager 106 receives instructions in the form of transaction requests from the UCC command processor 104 and routes instructions to components necessary to complete the requested transaction, such as the ALC manager 108 and the power savings application 120.

The ALC manager 108 routes instructions between the ALD 100 and each active load client 300 within the system 10 through an ALC interface 112. For instance, the ALC manager 108 tracks the state of every active load client 300 serviced by specified utilities by communicating with the active load client 300 through an individual IP address. The ALC interface 112 translates instructions (e.g., transactions) received from the ALC manager 108 into the proper message structure understood by the target active load client 300 and then sends the message to the active load client 300. Likewise, when the ALC interface 112 receives messages from an active load client 300, it translates the message into a form understood by the ALC manager 108 and routes the translated message to the ALC manager 108.

The ALC manager 108 receives from each active load client 300 that it services, either periodically or responsive to polling messages sent by the ALC manager 108, report messages containing the present power consumption (or information from which the present power consumption can be determined, such as current draw and operating voltage(s)) and status (e.g., "ON" or "OFF") of each device controlled by the active load client 300. Alternatively, if individual device metering is not available, then the total power consumption (or information from which the total power consumption can be determined) and load management status for the entire active load client 300 may be reported in a single report or status message. The information contained in each status or report message is stored in the ALD database 124 in a record associated with the specified active load client 300. The ALD database 124 contains all the information necessary to manage every customer account and power distribution. In one embodiment, the ALD database 124 contains customer contact information, such as names, addresses, phone numbers, email addresses, and associated utility companies, for all customers having active load clients 300 installed at their residences or businesses, as well as a description of specific operating instructions (e.g., customer preferences, such as set points and maximum permitted variances therefrom) for each managed device (e.g., IP-addressable smart breaker or appliance), device status, and device diagnostic history.

Depending on the quantity of active load clients 300 in the system 10 and the bandwidth, whether wired or wireless, allocated to support messaging between the active load clients 300 and the ALD 100, simultaneous or substantially simultaneous transmission of report messages from the active load clients 300 may exceed the allocated bandwidth and create a bottleneck in the ALMS 10 or its supporting network 80. Thus, varying or staggering the timing of transmissions of the report messages from the active load clients 300 (as well as polls or other messaging from the ALD 100) is important to increasing the likelihood that the messages are delivered to the ALD 100 (or the active load clients 300, as applicable) and that the delays or latency associated with the delivery of such messages is minimized. The timing of message transmissions in accordance with one exemplary embodiment of the present invention is described in detail below.

There are several types of messages that the ALC manager 108 may receive from an active load client 300 and process accordingly. One such message is a security alert message. A security alert message originates from an optional security or safety monitoring system installed at the service point 20 (e.g., in the residence or business) and coupled to the active load client 300 (e.g., wirelessly or via a wired connection). When a security alert message is received, the ALC manager 108 accesses the ALD database 124 to obtain routing information for determining where to send the alert, and then sends the alert as directed. For example, the ALD manager 108 may be programmed to send the alert or another message (e.g., an electronic mail message or a pre-recorded voice message) to a security monitoring service company and/or the owner of the residence or business.

Another message that may be communicated between an active load client 300 and the ALC manager 108 is a report trigger message. A report trigger message alerts the ALD 100 that a predetermined amount of power has been consumed by a specific device monitored by an active load client 300. When a report trigger message is received from an active load client 300, the ALC manager 108 logs the information contained in the message in the ALD database 124 for the customer associated with the information-supplying active load client 300. The power consumption information is then used by the ALC manager 108 to determine the active load client(s) 300 to which to send a power reduction or "Cut" message during a power reduction or control event.

Yet another message that may be exchanged between an active load client 300 and the ALC manager 108 is a status response message. A status response message reports the type and status of each device controlled by the active load client 300 to the ALD 100. When a status response message is received from an active load client 300, the ALC manager 108 logs the information contained in the message in the ALD database 124.

In one embodiment, upon receiving instructions (e.g., a "Cut" instruction) from the master event manager 106 to reduce power consumption for a specified utility, the ALC manager 108 determines which active load clients 300 and/or individually controlled devices to switch to the "OFF" state based upon present or prior power consumption data and customer personal settings 138 stored in the ALD database 124. Power consumption data may include power consumed, current draw, duty cycle, operating voltage, operating impedance, time period of use, set points, ambient and outside temperatures during use (as applicable), and/or various other energy use or environmental data. The ALC manager 108 then sends a message to each selected active load client 300 containing instructions to turn off all or some of the devices under the active load client's control.

In another embodiment, a power savings application 120 may be optionally included to calculate the total amount of power saved by each utility during a power reduction event (referred to herein as a "Cut event" or a "control event"), as well as the amount of power saved for each customer whose active load client 300 reduced the amount of power delivered. The power savings application 120 accesses the data stored in the ALD database 124 for each customer serviced by a particular utility and stores the total cumulative power savings (e.g., in megawatts per hour) accumulated by each utility for each Cut event in which the utility participated as an entry in the utility Power and Carbon ("P&C") database 134.

In a further embodiment, an optional carbon savings application 132 uses the information produced by the power savings application 120 to determine the amount of carbon or carbon equivalents saved by each utility and by each customer for every Cut event. Carbon savings information (e.g., type of fuel that was used to generate power for the customer set that was included in the just completed control event, power saved as a result of the control event, governmental standard calculation rates, and/or other data, such as generation mix per serving utility and geography of the customer's location and the location of the nearest power source) is stored in the ALD database 124 for each active load client 300 (customer) and in the utility P&C database 134 for each utility. The carbon savings application 132 calculates the total equivalent carbon credits saved for each active load client 300 (customer) and utility participating in the previous Cut event, and stores the information in the ALD database 124 and the utility P&C database 134, respectively.

A read meter application 136 may be optionally invoked when the UCC command processor 104 receives a "Read Meters" or equivalent command from the utility control center 200. The read meter application 136 cycles through the ALD database 124 and sends a read meter message or command to each active load client 300, or those active load clients 300 specifically identified in the utility control center's command, via the ALC manager 108. The information received by the ALC manager 108 from the active load client 300 is logged in the ALD database 124 for each customer. When all the active load client meter information has been received, the information is sent to the requesting utility control center 200 using a business to business (e.g., ebXML) or other desired protocol.

The optional security device management block 140 includes program instructions for handling security system messages received by the security interface 110. The security device management block 140 includes routing information for all security system messages and may further include messaging options on a per customer or service company basis. For example, one security service may require an email alert from the ALD 100 upon the occurrence of a security event; whereas, another security service may require that the message sent from the in-building system be passed on by the active load client 300 and the ALD 100 directly to the security service company.

In a further embodiment, the ALD 100 also includes a customer reports application 118 that generates reports to be sent to individual customers detailing the amount of power saved during a previous billing cycle. Each report may contain a cumulative total of power savings over the prior billing cycle, details of the amount of power saved per controlled device (e.g., per smart breaker or appliance), power savings from utility directed control events, power savings from customer directed control events, devices being managed, total carbon equivalents used and saved during the period, and/or specific details for each Cut event in which the customer's active load client 300 participated. Customers may also receive incentives and awards for participation in the ALMS 10 through a customer rewards program 150. For example, the utilities or a third party system operator may enter into agreements with product and/or service providers to offer system participants discounts on products and services offered by the providers based upon certain participation levels or milestones. The rewards program 150 may be setup in a manner similar to conventional frequent flyer programs in which points are accumulated for power saved (e.g., one point for each megawatt saved or deferred) and, upon accumulation of predetermined levels of points, the customer can select a product or service discount. Alternatively, a serving utility may offer a customer a rate discount for participating in the ALMS 10.

Figure 5:
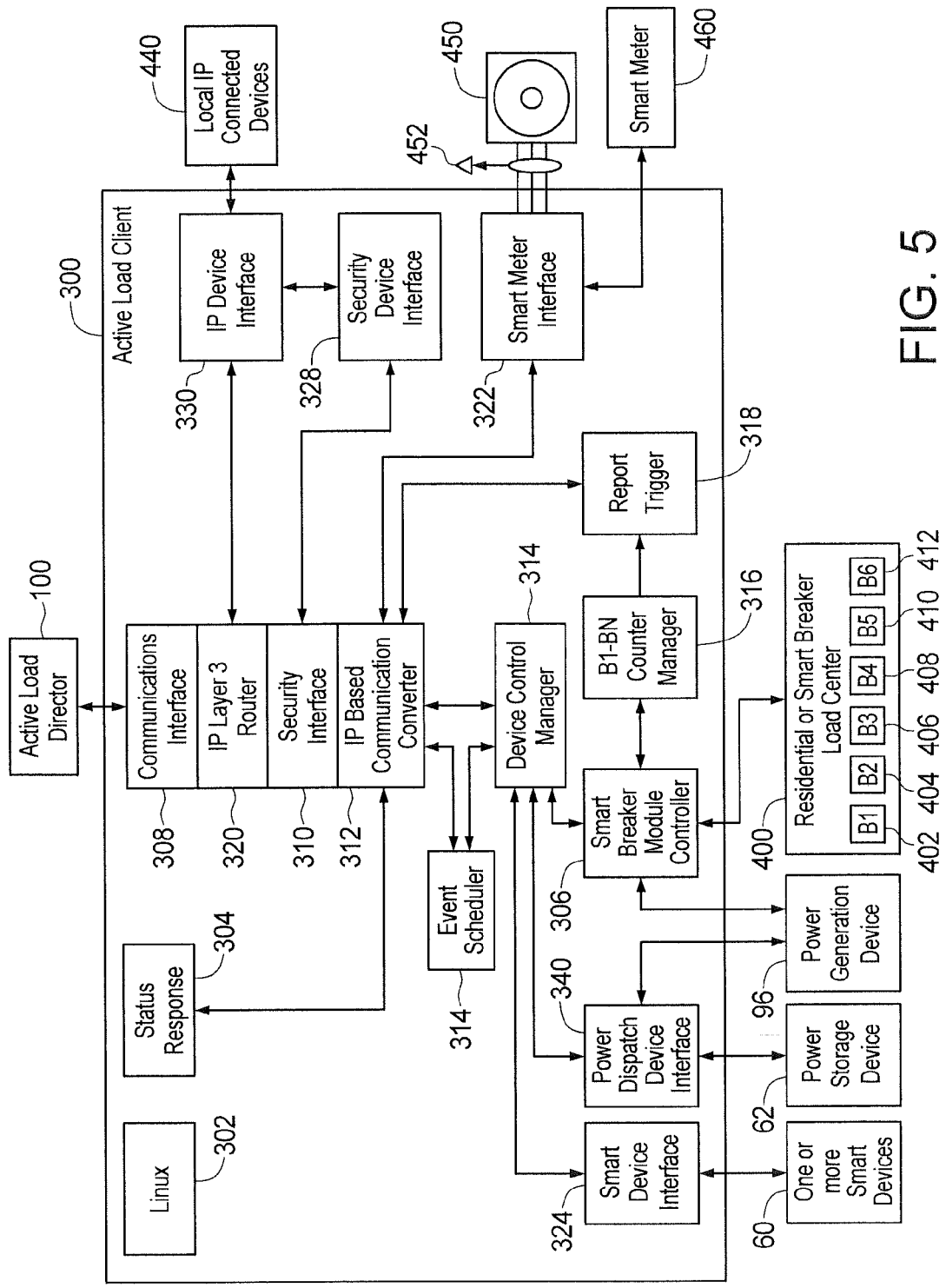
FIG. 5 is a block diagram illustrating an exemplary active load client and smart breaker load center as shown in the active load management system of FIG. 3.

FIG. 5 illustrates a block diagram of an exemplary active load client 300 and residential load center 400 as used in accordance with one embodiment of the ALMS 10 of FIG. 3. The depicted active load client 300 includes a smart breaker module controller 306, a communications interface 308, a security interface 310, an IP-based communication converter 312, a device control manager 314, a smart breaker (B1-BN) counter manager 316, an IP router 320, a smart meter interface 322, a smart device interface 324, an IP device interface 330, and a power dispatch device interface 340. The active load client 300, in this embodiment, is a computer or processor-based system located on-site at a service point 20 (e.g., customer's residence or business). The primary function of the active load client 300 is to manage the power load levels of controllable, power consuming devices located at the service point 20, which the active load client 300 oversees and controls on behalf of the customer. Each active load client 300 is installed in a fixed location at a respective service point 20 and includes wired and/or wireless communications capability as described in more detail below. Thus, each active load client 300 is effectively a specially configured, immobile communication device operating in the ALMS 10.

In an exemplary embodiment, the active load client 300 may include dynamic host configuration protocol (DHCP) client functionality to enable the active load client 300 to dynamically request IP addresses for itself and/or one or more controllable devices 402-412, 60 managed thereby from a DHCP server on the host IP network 80 facilitating communications between the active load client 300 and the ALD 100. The active load client 300 may further include router functionality and maintain a routing table of assigned IP addresses in a memory of the active load client 300 to facilitate delivery of messages from the active load client 300 to the controllable devices 402-412, 60. The active load client 300 may further include power dispatch functionality (e.g., power dispatch device interface 340) and provide information to the ALD 100 regarding power available for dispatch from a power generation device 96 and/or a power storage device 62 at the service point 20.

A communications interface 308 facilitates connectivity between the active load client 300 and the ALD 100. Communication between the active load client 300 and the ALD 100 may be based on any type of IP or other connection-based protocol, including but not limited to, the WiMax protocol. Thus, the communications interface 308 may be a wired or wireless modem, a wireless access point, or other appropriate interface.

A standard IP Layer-3 router 320 routes messages received by the communications interface 308 to the active load client 300 and to any other locally connected device(s) 440. The router 320 determines if a received message is directed to the active load client 300 and, if so, passes the message to a security interface 310 to be decrypted. The security interface 310 provides protection for the contents of the messages exchanged between the ALD 100 and the active load client 300. The message content is encrypted and decrypted by the security interface 310 using, for example, a symmetric encryption key composed of a combination of the IP address and global positioning system (GPS) data for the active load client 300 or any other combination of known information. If the message is not directed to the active load client 300, then it is passed to the IP device interface 330 for delivery to one or more locally connected devices 440. For example, the IP router 320 may be programmed to route ALMS messages as well as conventional Internet messages. In such a case, the active load client 300 may function as a gateway for Internet service supplied to the residence or business instead of using separate Internet gateways or routers. When functioning to route both ALMS messages and conventional Internet messages (e.g., as a gateway for general Internet service), the IP router 320 may be programmed with a prioritization protocol that provides priority to the routing of ALMS messages, or at least some ALMS messages (e.g., those associated with control events).

An IP based communication converter 312 opens incoming messages from the ALD 100 and directs them to the appropriate function within the active load client 300. The converter 312 also receives messages from various active load client 300 functions (e.g., a device control manager 314, a status response generator 304, and a report trigger application 318), packages the messages in the form expected by the ALD 100, and then passes them on to the security interface 310 for encryption.

The device control manager 314 processes power management commands for control components of various controllable devices logically connected to the active load client 300. The control components can be smart breakers 402-412 (six shown) or controllers of smart devices 60, such as control modules of smart appliances. Each smart breaker component 402-412 is associated with at least one device and may be implemented as a load controller. A load controller may be configured to: (i) interrupt or reduce power to one or more associated devices during a control event, (ii) sense power demand during a control event, (iii) detect power generation from an associated device (when the associated device is a power generation device 96), (iv) sense conditions or characteristics (e.g., temperature, humidity, light, etc.) of an environment in which the associated device is operating, (v) detect device degradation or end of life, (vi) communicate with other device controllers at the service point 20 and/or within the ALMS 10, and/or (vii) validate operating performance of its associated device or devices. The load controller can manage multiple devices.

The device control manager 314 also processes "Query Request" or equivalent commands or messages from the ALD 100 by querying a status response generator 304, which maintains the type and status of each device controlled by the active load client 300, and providing the statuses to the ALD 100. The "Query Request" message may include information other than mere status requests, such as temperature set points or other environmental characteristic/condition set points for thermally controlled or environmentally-dependent devices, time intervals during which load control is permitted or prohibited, dates during which load control is permitted or prohibited, and priorities of device control (e.g., during a power reduction control event, hot water heater and pool pump are turned off before HVAC unit is turned off). If temperature set points or other non-status information are included in a "Query Request" message and there is a device 60 attached to the active load client 300 that can process the information, the temperature set points or other information are sent to that device 60 via a smart device interface 324.

The status response generator 304 receives status messages from the ALD 100 and, responsive thereto, polls each power consuming device 60, 402-412, 460 under the active load client's control to determine whether the device 60, 402-412, 460 is active and in good operational order. Each device 60, 402-412, 460 (e.g., through its associated controller) responds to the polls with operational information (e.g., activity status and/or error reports) in a status response message. The active load client 300 stores the status responses in a memory associated with the status response generator 304 for reference in connection with control events.

The smart device interface 324 facilitates IP or other address-based communications to individual devices 60 (e.g., smart appliance power control modules) that are communicatively connected to the active load client 300. The connectivity can be through one of several different types of networks, including but not limited to, BPL, ZigBee, Wi-Fi, Bluetooth, or direct Ethernet communications. Thus, the smart device interface 324 is a modem adapted for use in or on the network connecting the smart devices 60 to the active load client 300. The smart device interface 324 also allows the device control manager 314 to manage those devices that have the capability to sense temperature settings and respond to variations in temperature or other environmental characteristics or conditions.

The smart breaker module controller 306 formats, sends, and receives messages to and from the smart breaker module or load center 400. In one embodiment, the communication is preferably through a BPL connection. In such embodiment, the smart breaker module controller 306 includes a BPL modem and operations software. The smart breaker module 400 contains individual smart breakers 402-412, wherein each smart breaker 402-412 includes an applicable modem (e.g., a BPL modem when BPL is the networking technology employed) and is preferably in-line with power supplied to a single appliance or other device. The B1-BN counter manager 316 determines and stores real time power usage for each installed smart breaker 402-412. For example, the counter manager 316 tracks or counts the amount of power used through each smart breaker 402-412 and stores the counted amounts of power in a memory of the active load client 300 associated with the counter manager 316. When the counter for any breaker 402-412 reaches a predetermined limit, the counter manager 316 provides an identification number corresponding to the smart breaker 402-412 and the corresponding amount of power (power number) to the report trigger application 318. Once the information is passed to the report trigger application 318, the counter manager 316 resets the counter for the applicable breaker 402-412 to zero so that information can once again be collected. The report trigger application 318 then creates a reporting message containing identification information for the active load client 300, identification information for the particular smart breaker 402-412 or power consuming device associated therewith, and the power number, and sends the report to the IP based communication converter 312 for transmission to the ALD 100. The ALD 100 stores the power consumption data in the ALD database 124 or other repository.

The smart meter interface 322 manages either smart meters 460 that communicate using, for example, BPL or a current sensor 452 connected to a traditional power meter 450. When the active load client 300 receives a "Read Meters" command or message from the ALD 100 and a smart meter 460 is attached to the active load client 300, a "Read Meters" command is sent to the meter 460 via the smart meter interface 322 (e.g., a BPL modem). The smart meter interface 322 receives a reply to the "Read Meters" message from the smart meter 460, formats this information along with identification information for the active load client 300, and provides the formatted message to the IP based communication converter 312 for transmission to the ALD 100.

A security device interface 328 transfers security messages to and from any attached security device. For example, the security device interface 328 may be coupled by wire or wirelessly to a monitoring or security system that includes motion sensors, mechanical sensors, optical sensors, electrical sensors, smoke detectors, carbon monoxide detectors, and/or other safety and security monitoring devices. When the monitoring system detects a security or safety problem (e.g., break-in, fire, excessive carbon monoxide levels, etc.), the monitoring system sends its alarm signal to the security interface 328, which in turn forwards the alarm signal to the IP network through the ALD 100 for delivery to the target IP address (e.g., the security monitoring service provider). The security device interface 328 may also be capable of communicating with the attached security device through the IP device interface 330 to recognize a notification message from the device that it has lost its line based telephone connection. Once that notification has been received, an alert message is formatted and sent to the ALD 100 through the IP based communication converter 312.

Within the ALMS 10, power consumption data is transmitted from the active load clients 300 to the ALD 100 during regular transmission reporting periods or pulses. Typically, reported data (e.g., in the form of report messages) is sent every several seconds (e.g., every 5-10 seconds). The reporting messages are sent over the communication network 80 from the active load clients 300 to the ALD 100. As illustrated in FIG. 3 and described above, the communication network 80 may be a hybrid network that includes a fixed bandwidth, wireless link between each active load client 300 and a base station 90, and a fixed or variable bandwidth wired and/or wireless link between the base station 90 and the ALD 100.

Figure 6:
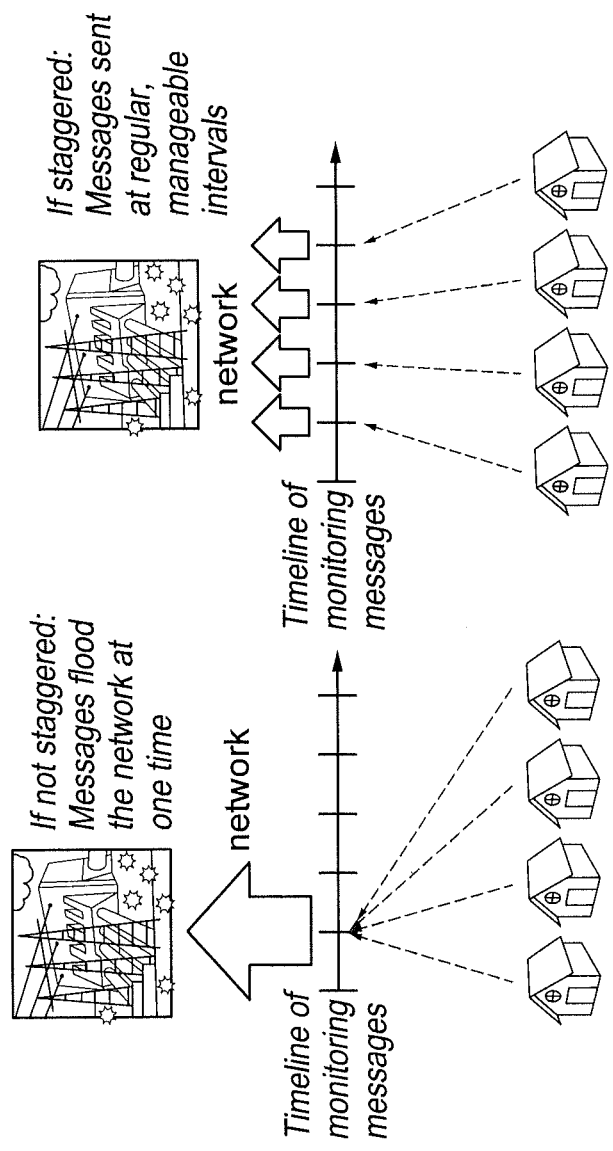
FIG. 6 is a block diagram and timeline providing a comparison of uncontrolled and controlled messaging in an active load management system, in accordance with an exemplary embodiment of the present invention.

Due to the fixed bandwidth nature of one or more communication links forming part of the network 80, the possibility exists that the simultaneous or substantially simultaneous transmission of reporting messages from the active load clients 300 could overwhelm the lowest bandwidth link of the network 80 (e.g., which may be provided by a data service provider, such as an Internet service provider (ISP)) and prevent the ALD 100 from receiving all of the messages. The likelihood of such a possibility depends upon the quantity of active load clients 300 in the ALMS 10 or a particular portion thereof, the sizes of the reporting messages, and the bandwidth of the lowest capacity link in the network 80 (or at least serving the active load clients 300 in a portion of the ALMS 10). As illustrated in FIG. 6, if all or most of the active load clients 300 in a utility's service area send reporting or other messages during the same transmission pulse or period, then the messages may arrive at the lowest capacity communication link (e.g., the ISP network) at the same time, resulting in some lost messages and/or some delayed messages. However, as also illustrated in FIG. 6, if the timing of transmission of the reporting messages is controlled or managed such that only a quantity of messages that is within the capacity of the lowest bandwidth link of the network 80 is permitted, then the ISP network supplying the lowest capacity link is better able to receive and transmit those messages without message loss or extraordinary delay.

In accordance with one embodiment of the present invention as illustrated by the logic flow 700 of FIG. 7, a central controller, such as the ALD 100, determines (701) the transmission constraints of the network 80 and, based thereon, determines transmission timing for messages sent by the active load clients 300 such that the messages are varied or staggered enough in time to arrive at the network 80 in a more distributed and balanced fashion. The ALD 100 may receive capacity information from the network 80. The ALD 100 may also receive system size and reporting criteria information from the utility (e.g., the quantity of active load clients 300 in the ALMS 10, transmission increment assignments to groups of active load clients 300, the length or duration of each reporting period or a quantity of transmission increments in each reporting period, and sequential or other identifiers for the active load clients 300). Based on such capacity and system information, the ALD 100 can assign (703) active load clients 300 to transmission increments and determine (705) transmission timing for each active load client 300 within its assigned transmission increment to meet ALMS reporting criteria. The ALD 100 sends (707) the transmission timing information to each active load client 300 instructing it when to transmit reporting messages.

According to the present invention, messages transmitted from the active load clients 300 to the ALD 100, such as any of the active load client messages described above, are controlled (e.g., staggered, ordered, or otherwise strategically timed) such that substantial numbers of messages transmitted by the active load clients 300 do not arrive at the smallest or lowest bandwidth point in the network 80 at the same time. The portion of the network 80 with the smallest bandwidth will typically be the fixed bandwidth wireless link of the network 80 between the active load clients 300 and the ALD 100, especially when the wireless link is a portion of a public wireless system, such as a cellular phone system, and is shared with thousands of wireless system users. Control of the transmission timing of active load client messages may be performed by the ALD 100 or by each active load client 300 in accordance with various embodiments of the present invention.

For example, in one embodiment, messages are transmitted to the ALD 100 on a regular, pulsed basis. A pulse, transmission period, or reporting period may last seconds, minutes, or hours. For example, if messages are to be sent to the ALD 100 every five (5) seconds, then all the active load clients 300 may be programmed or instructed to stagger or vary the timing of their message transmissions during each five second transmission period. Thus, if there are one thousand (1000) active load clients 300 in an ALMS 10, then to evenly distribute message transmissions throughout the transmission cycle, two hundred (200) active load clients 300 would be required to transmit reporting messages to the ALD 100 every second (i.e., 1000 active load clients/5 seconds per pulse or transmission period=200 messages per second). Therefore, all the active load clients 300 in this example may be divided up so that their transmissions are distributed evenly across the transmission period, or 200 transmissions every second.

In one embodiment of the present invention, the ALD 100 informs each active load client 300 as to the active load client's transmission time in each transmission period or cycle. Alternatively, the ALD 100 may provide data to each active load client 300 in order to enable each active load client 300 to determine its own respective transmission time.

According to a primary embodiment of the present invention, transmission time is dependent upon several parameters or factors, including: (a) an identifier (ID) associated with the active load client 300 (e.g., utility-assigned sequential number, IP or other network address, etc.), (b) the total number of active load clients 300 in the ALMS 10, (c) the transmission increment within a transmission period or pulse, which has been assigned to a particular active load client or group of active load clients, and (d) the number of transmission increments per transmission or reporting period. Use of the aforementioned parameters to determine an active load client's transmission time is detailed below.

In accordance with one exemplary embodiment, the utility provides the transmission time determination factors to the ALD 100 for determination of the transmission times for the active load clients 300. Pursuant to this embodiment, when the utility installs a new active load client 300, the utility assigns the active load client 300 a numeric identifier (ALC ID), which may be different than the active load client's serial number or IP address. In one embodiment, each ALC ID is preferably a sequential number from one to the total number of active load clients 300 in the ALMS 10, and each ALC ID is unique. Thus, if there are one thousand (1000) active load clients 300 in the ALMS 10, one active load client 300 would be assigned an ALC ID of "1," another active load client 300 would be assigned an ALC ID of "2," and so on until the last active load client 300 is assigned an ALC ID of "1000." When new active load clients 300 are added to the ALMS 10, they are assigned new ALC IDs, which may increase the total number of ALC IDs. The ALC IDs of active load clients 300 associated with customers who no longer have accounts with the utility may be reassigned to new customers. The ALD 100 maintains a running total of the quantity of active load clients 300 operating in each utility service area. To insure that the ALD's running total of active load clients 300 is accurate, the utility preferably provides an indication of the then-current total quantity of active load clients 300 to the ALD 100 on a periodic basis (e.g., once a day or once a week). Alternatively, the ALC ID may be computed from the serial number, IP address, or other identifier for the active load client 300 to ultimately arrive at an identifier that at least uniquely defines the active load client 300 within a group of active load clients 300. In one alternative embodiment, multiple active load clients 300 may have the same ALC ID, but be associated with different groups of active load clients 300, with each group being assigned a different transmission increment as described in more detail below.

Next, in the event that the utility provides the ALD 100 with the duration of the transmission/reporting period and the duration or length of each transmission increment instead of the total quantity of transmission increments per reporting period, the ALD 100 determines the quantity of transmission increments within a reporting period or pulse. Such a determination may be made by dividing the reporting period duration by the length of each transmission increment. For example, if the reporting period is five (5) seconds and the transmission increment is 0.5 seconds (i.e., a group of active load clients 300 transmits reporting messages every 0.5 seconds), then the quantity of transmission increments within a reporting period is 5/0.5=10 transmission increments.

After receiving or determining the quantity of transmission increments per reporting period, the ALD 100, according to one embodiment, determines the quantity of active load clients 300 per group (or, equivalently, per transmission increment) by dividing the total quantity of active load clients 300 by the quantity of transmission increments. For example, if there are one thousand (1000) active load clients 300 operating in a utility service area at one thousand (1000) customer service points 20 and there are ten (10) transmission increments, then the quantity of active load clients 300 per transmission increment is 1000/10=100 active load clients per transmission increment.

The ALD 100 may then assign or allocate the transmission increments among the active load clients 300 evenly or in some other manner such that the active load clients 300 are organized into groups and each group is allocated a transmission increment. For example, if there are one hundred (100) active load clients 300 per group, transmission increments are allocated evenly among the active load clients 300, each transmission increment is 0.5 seconds, and each reporting period is five (5) seconds, then the first group of active load clients 300 would transmit during the time period from t to t+0.5 seconds; the second group of active load clients 300 would transmit during the time period from t+0.5 seconds to t+1.0 seconds; the third group of active load clients 300 would transmit during the time period from t+1.0 seconds to t+1.5 seconds; and so forth until the last group of active load clients 300 transmitted during the time period from t+4.95 seconds to t+5.0 seconds.

Additionally, after determining the groupings of the active load clients 300, the ALD 100 may change the ALC ID of some of the active load clients 300 to reflect the active load client's sequence in its assigned group in order to determine the transmission time for each active load client 300 within a particular transmission increment. For example, if each group of active load clients 300 includes one hundred (100) active load clients 300, then ALC IDs for the active load clients 300 having ALC IDs 1-100 would remain the same, but the ALC IDs for the other active load clients 300 would change to reflect there positions in the other groups. For instance, the ALC IDs for the active load clients 300 having ALC IDs 101-200 would become 1-100 in connection with group 2, the ALC IDs for the active load clients 300 having ALC IDs 201-300 would become 1-100 in connection with group 3, and so forth.

In accordance with one embodiment of the present invention, the following equation may be used to determine the transmission time for each active load client 300 during the transmission increment assigned to the group containing the particular active load client 300 based on the active load client's sequence (ALC ID) in its group:

$$trans\text{ time} = \left(\left\lceil \frac{ALC\ ID}{\text{number of customers per increment}} \right\rceil\right) \times \text{length of } trans \text{ increment}$$

where:
"ALC ID" is the sequence number for the active load client within its assigned group; "trans" is short for "transmission";

$$\text{number of customers per increment} = \frac{\text{number of } ALCs}{\text{number of } trans \text{ increments per } trans \text{ pulse}}$$

"ALCs" means active load clients;

length of $trans$ increment = the length of time of a transmission increment within a transmission pulse and $$\text{number of } trans \text{ increments per } trans \text{ pulse} = \frac{\text{length of a transmission pulse}}{\text{length of increment}}.$$

In a primary embodiment of the present invention, the ALD 100 provides the transmission time to each active load client 300 on a regular basis, such as daily. In an alternative embodiment, the ALD 100 may provide an indication of an assigned transmission increment to each active load client 300 and each active load client 300 may employ a random number generator to determine exactly when to transmit within the assigned transmission increment.

In another alternative embodiment as illustrated by the logic flow 800 of FIG. 8, the ALD 100 may provide transmission time determination parameters (e.g., ALC ID, total number of active load clients, transmission period duration and start time, transmission increment identification or position within the transmission period, and number of transmission increments per transmission period) to the active load clients 300 so that each active load client 300 can determine its own transmission time within its assigned transmission increment. Providing the transmission time determination parameters to the active load clients 300 saves the ALD 100 from the burden of having to determine the transmission time for each active load client 300 and instead spreads the determination burden to the active load clients 300. In such a case, each active load client 300 is programmed with the above equations for determining its respective transmission reporting time. Alternatively, each active load client 300 may employ a random number generator to determine when to transmit within its assigned transmission increment.

In a further embodiment, each active load client 300 may also modulate its report message with an orthogonal code (e.g., pseudo-noise code) to further assist the ALD 100 in distinguishing active load client transmissions in the ALMS 10.

Referring again to FIGS. 4 and 5, the ALD 100 may receive the following information (which may be in the form of an update or equivalent message) from the utility control center 200 on a regular basis to assist the ALD 100 with determining transmission times for the active load clients 300 under the control of the ALD 100: ALC IDs; total quantity of active load clients 300 (which may be omitted if the ALD 100 can determine the total quantity of active load clients 300 from the ALC IDs); transmission increment duration and/or assignment to groups of active load clients 300; and quantity of transmission increments per reporting period. The foregoing information is received from the network 80 by the UCC command processor 104 and is provided to the ALC manager 108. The ALC manager 108 then uses the information to determine the transmission time for each active load client 300 as detailed above. In one embodiment, the ALC manager 108 generates control messages containing indications of the transmission times for the active load clients 300 and provides the control messages to the ALC interface 112, which then communicates the control messages to the active load clients 300 over the network 80. In this case, the communications interface 308 for each active load client 300 receives the control message addressed to the respective device 100 from the network 80 and provides the control message to the device control manager 314 or other processor. The device control manager 314 then generates an ALC report message and provides the report message to the communications interface 308 for transmission at the transmission time indicated in the previously received control message.

Alternatively, when each active load client 300 is programmed to determine its own transmission time (as opposed to receiving it from the ALD 100) as illustrated in FIG. 8, the active load client's communications interface 308 receives (801) one or more control messages from the ALD 100 or another central controller via the network 80. The control message(s) contain the transmission time determination parameters and are provided to the device control manager 314 or an equivalent processor for determination of the transmission time for a reporting message. The reporting message includes power consumption information and may contain, for example, passive sampling data indicating an aggregate quantity, or individual quantities, of power consumed by power consuming devices located at the service point at which the active load client 300 is installed. Each active load client determines (803) its transmission time based on the received transmission time determination parameters as detailed above and transmits (805) the reporting message to the ALD 100 or similar central controller at the determined transmission time. By determining individual transmission times based on the received parameters, the active load clients 300 in a utility's service area may implement a varied or staggered messaging protocol to communicate reporting messages to the ALD 100 over the network 80 so as to reduce the potential for overwhelming the network 80 or the ALD 100 and, thereby, increasing the likelihood that all the reporting messages will be timely received by the ALD 100.

As described above, the present invention encompasses an apparatus and method for controlling a flow of messages between installed customer equipment, such as metered gateways, smart meters, or other active load client devices, and a central controller, such as an ALD or a utility control center. With this invention, electric cooperatives, municipalities, or other electric power supplying entities using advanced metering infrastructure (AMI) or smart meters will be able to communicate information in a timely manner throughout their active load management systems with minimal loss of data, notwithstanding capacity or bandwidth limitations in communication networks supporting such systems.

In the foregoing specification, the present invention has been described with reference to specific embodiments. However, one of ordinary skill in the art will appreciate that various modifications and changes may be made without departing from the spirit and scope of the present invention as set forth in the appended claims. For example, the transmission timing process described herein is applicable for a variety of communications between the utility control center and the customer equipment installed at the service points in a utility's service area, including any equipment used to implement an AMI device, such as a smart meter. Additionally, the message flow procedure disclosed above may be analogously used to control or manage the flow of messages from the ALD 100 or any other central controller (including, for example, the utility control center 200) to the active load clients 300 or any other fixed customer premises equipment (e.g., smart meters) so as to mitigate the loss or delay of messages (e.g., data packets) in the downlink or reverse link direction.

Benefits, other advantages, and solutions to problems have been described above with regard to specific embodiments of the present invention. However, the benefits, advantages, solutions to problems, and any element(s) that may cause or result in such benefits, advantages, or solutions to become more pronounced are not to be construed as a critical, required, or essential feature or element of any or all the claims. The invention is defined solely by the appended claims including any amendments made during the pendency of this application and all equivalents of those claims as issued.

What is claimed is:

1. A method for a communication device operating within an active load management system to control transmission of at least one message over a fixed bandwidth communication link, the at least one message providing information relating to electric power consumption by power consuming devices located at a service point at which the communication device is located and fixedly positioned, the method comprising:
   receiving at least one control message from a central controller, the at least one control message including transmission time determination parameters, the transmission time determination parameters including (a) an identifier associated with the communication device, (b) a number representing a quantity of communication devices within the active load management system, (c) a number representing a quantity of transmission increments within a reporting period during which messages are to be transmitted by the plurality of communication devices, and (d) identification of a transmission increment assigned to a group of communication devices containing the communication device; and
   determining a transmission time for the at least one message based on the transmission time determination parameters;
   wherein the step of determining a transmission time for the at least one message comprises:
      determining a quantity of communication devices within the group containing the communication device based on (a) the number representing the quantity of communication devices within the active load management system and (b) the number representing the quantity of transmission increments within the reporting period;
      determining a duration of the transmission increment assigned to the group containing the communication device; and
      determining a transmission time for the at least one message based on (a) the identifier associated with the communication device, (b) the quantity of communication devices within the group containing the communication device, and (c) the duration of the transmission increment assigned to the group containing the communication device.

2. The method of claim 1, wherein the step of determining a duration of the transmission increment assigned to the group containing the communication device comprises:
   determining the duration of the transmission increment allocated to the group of communication devices containing the communication device based on the quantity of transmission increments within the reporting period and a duration of the reporting period.

3. The method of claim 1, further comprising:
transmitting the at least one message at the transmission time over the communication link.

4. An active load management system operable to control transmission of messages over a communication link, the messages providing information reporting electric power consumption by power consuming devices located at service points receiving electrical power from a utility, the active load management system comprising:
   a plurality of active load client devices, each active load client device including:
      a communications interface operable to receive at least one control message indicating a transmission time for transmitting at least one report message, the at least one report message providing information relating to electric power consumption by power consuming devices located at a service point at which the active load client device is located; and
      a device control manager operably coupled to the communications interface, the device control manager operable to generate the at least one report message and supply the at least one report message to the communications interface for transmission at the transmission time;
   an active load director that includes:
      an active load client manager operable to:
         determine a transmission period during which report messages are to be transmitted by the plurality of active load client devices,
         determine a plurality of transmission increments within the transmission period,
         allocate each transmission increment to a respective group of the plurality of active load client devices,
         determine transmission times for the report messages based on (a) identifiers for the plurality of active load client devices, (b) respective durations of transmission increments allocated to respective groups of the plurality of active load client devices, and (c) a quantity of active load client devices in each group, and
         generate control messages that include indications of the transmission times; and
      an active load client interface operably coupled to the active load client manager and the communication link, the active load client interface operable to communicate the control messages to the plurality of active load client devices over the communication link.

5. The active load management system of claim 4, wherein the active load director further includes:
   a utility control center command processor operably coupled to the active load client manager and a second communication link between the active load director and a control center of the utility, the utility control center command processor operable to receive from the control center of the utility and provide to the active load client manager at least one update message including (a) the identifiers for the plurality of active load client devices, (b) a number representing a quantity of the plurality of active load client devices, (c) a number representing a quantity of the plurality of transmission increments within the transmission period, and (d) identifications of transmission increments assigned to groups of the plurality of active load client devices;
   wherein the active load client manager is further operable to determine transmission times for the report messages based on the at least one update message.

6. The active load management system of claim 4, wherein the communications interface supports a wide area wireless protocol.

* * * * *

UNITED STATES PATENT AND TRADEMARK OFFICE
CERTIFICATE OF CORRECTION

PATENT NO.       : 8,855,279 B2                                                Page 1 of 1
APPLICATION NO.  : 12/900884
DATED            : October 7, 2014
INVENTOR(S)      : Joseph W. Forbes, Jr., Joel L. Webb and John O. F. Long It is certified that error appears in the above-identified patent and that said Letters Patent is hereby corrected as shown below:

Title page, item (60), as continued on page 2, at lines 2-3 of the continued item, delete "now Pat. No. 7,715,951, application No. 12/900,884, which is a continuation-in-part of" and insert --now Pat. No. 7,715,951. Continuation-in-part of--.

In the Claims, column 24, line 34, delete "plurality of".

Signed and Sealed this
Tenth Day of March, 2015

Michelle K. Lee
*Deputy Director of the United States Patent and Trademark Office*